United States Patent
Sasada et al.

(10) Patent No.: US 9,133,357 B2
(45) Date of Patent: Sep. 15, 2015

(54) WHITE INK COMPOSITION, INK SET FOR FORMING MULTIPLE LAYERS, IMAGE FORMING METHOD AND PRINTED MATTER

(71) Applicant: FUJIFILM CORPORATION, Minato-ku, Tokyo (JP)

(72) Inventors: Misato Sasada, Kanagawa (JP); Hiroshi Yamamoto, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/192,858

(22) Filed: Feb. 27, 2014

(65) Prior Publication Data

US 2014/0287206 A1  Sep. 25, 2014

(30) Foreign Application Priority Data

Mar. 22, 2013  (JP) ................................. 2013-060728

(51) Int. Cl.
| | |
|---|---|
| C09D 11/00 | (2014.01) |
| B41J 2/01 | (2006.01) |
| C09D 11/38 | (2014.01) |
| C09D 11/101 | (2014.01) |
| C09D 11/322 | (2014.01) |
| C09D 11/40 | (2014.01) |

(52) U.S. Cl.
CPC . *C09D 11/38* (2013.01); *B41J 2/01* (2013.01); *C09D 11/101* (2013.01); *C09D 11/322* (2013.01); *C09D 11/40* (2013.01); *Y10T 428/24901* (2015.01)

(58) Field of Classification Search
None
See application file for complete search history.

(56) References Cited

U.S. PATENT DOCUMENTS

| | | |
|---|---|---|
| 2007/0060670 A1 | 3/2007 | Ellis |
| 2012/0052256 A1 | 3/2012 | Nakamura et al. |
| 2014/0104357 A1 | 4/2014 | Shimohara |
| 2014/0132685 A1 | 5/2014 | Amao et al. |

FOREIGN PATENT DOCUMENTS

| | | |
|---|---|---|
| EP | 1426422 A | 6/2004 |
| JP | H06287499 A | 10/1994 |
| JP | 08-325491 A | 12/1996 |
| JP | 2002-275403 A | 9/2002 |
| JP | 2004-190032 A | 7/2004 |
| JP | 2008-308692 A | 12/2008 |
| JP | 2012-046569 A | 3/2012 |
| JP | 2012-97214 A | 5/2012 |
| JP | 2013-006968 A | 1/2013 |
| JP | 2013-018846 A | 1/2013 |
| WO | 2013/008691 A | 1/2013 |

OTHER PUBLICATIONS

Machine Translation of JP 06-287499 A.*
U.S. Appl. No. 14/182,228, filed Feb. 17, 2014, Titled "Ink Composition for Inkjet".
Extended European Search Report dated Jun. 25, 2014, issued in corresponding EP application.
English language translation of the following: Office action dated Dec. 16, 2014, from the JPO in a Japanese patent application corresponding to the instant patent application. This office action translation is submitted now in order to supplement the understanding of the cited references which are being disclosed in the instant Information Disclosure Statement.

* cited by examiner

*Primary Examiner* — Vu A Nguyen
(74) *Attorney, Agent, or Firm* — Solaris Intellectual Property Group, PLLC

(57) ABSTRACT

The invention provides a white ink composition for inkjet recording, including: titanium dioxide having an average primary particle diameter of from 200 nm to 350 nm; a hydrophilic, layered clay mineral; a water-soluble resin; and water. The invention further provides: an ink set for multilayer formation including the white ink composition and an ink composition for inkjet recording, including a colorant having a hue other than white; an image forming method including applying the white ink composition to a recording medium and irradiating the white ink composition applied to the recording medium with an active energy ray; and a printed matter including an image formed on a recording medium by the image forming method.

18 Claims, No Drawings

WHITE INK COMPOSITION, INK SET FOR FORMING MULTIPLE LAYERS, IMAGE FORMING METHOD AND PRINTED MATTER

CROSS-REFERENCE TO RELATED APPLICATION

This application claims priority under 35 USC 119 from Japanese Patent Application No. 2013-060728 filed on Mar. 22, 2013, the disclosure of which is incorporated by reference herein.

BACKGROUND OF THE INVENTION

1. Technical Field

The present invention relates to a white ink composition for inkjet recording, an ink set for multilayer formation including the white ink composition, an image forming method using the white ink composition, and a printed matter formed by the white ink composition.

2. Description of the Related Art

As image recording methods for forming an image on a recording medium such as paper based on an image data signal, there are electrophotographic systems, sublimation type and melt type thermal transfer systems, inkjet systems, and the like.

Inkjet systems use inexpensive devices to eject ink on only a necessary image area so as to directly form an image on a recording medium. Accordingly, the inkjet systems allow efficient use of ink and have an advantage of low running cost. In addition, inkjet printing is less noisy and excellent as an image recording system.

Among ink compositions used for image recording by inkjet systems, an active energy ray curable aqueous ink composition is a technology having many excellent characteristics and potentials. For example, the composition can be suitably used for image printing, pre-treatment for providing printability to a recording medium, post-treatment for protection and decoration of a printed image, and the like. In addition, the composition mainly composed of water is highly safe, and the decreased viscosity of the composition allows for the application thereof to high density inkjet recording.

In recent years, ink images formed by ink composition on recording media made of resin have increasingly been used for purposes such as large-area advertisements and outdoor advertisements.

The greatest advantage of inkjet systems is their suitability for forming wide printed matters. As image drawing systems for inkjet printing, there are a single-pass system and a shuttle-scan system. The former is a system in which an inkjet head having a paper width is prepared and a recording medium is moved under the head to print an image on the medium. The single-pass system has an advantage of enabling high speed printing. However, for wide drawing, the system is disadvantageous, since it is necessary to arrange the width of the inkjet head over the width of the drawing, device cost increases. On the other hand, the shuttle-scan system is a system in which an inkjet head with a narrow width is moved in a direction intersecting with respect to a paper moving direction to perform drawing. This is not suitable for purposes requiring high speed drawing, as in the single-pass system, but is an effective drawing system in terms of reducing device cost in drawing on a wide base material. Such a shuttle-scan drawing method is mainly used in the fields of signs and displays.

Particularly, for outdoor advertisements, images needs to be highly durable. Additionally, in order to successively form large-area printed matters or many sheets of printed matter, it is necessary to perform a step of removing stains on the printer by use of an organic solvent. However, when the organic solvent used for cleaning has scattered and adhered onto a formed ink image, if it is an image having low solvent resistance, the portion of the image on which the solvent has been adhered is dissolved and removed, causing image defects such as missing nozzles. Accordingly, there has been a desire for an ink composition capable of forming an image having high levels of both water resistance and solvent resistance.

In order to use for signs and displays, it has been necessary to enable drawing on various base materials. Examples of plastic base materials include polyvinyl chloride (PVC), polyethylene terephthalate (PET), various polyesters, and polyolefins such as polyethylene and polypropylene. One of effective printing methods for signs and displays is to use a transparent base material for printed matter. However, it has been difficult for printed matter obtained by drawing on a transparent base material to have sufficient image density because of the optical transparency of the base material itself.

Accordingly, in order to further improve the sharpness of an image formed on a transparent base material or a light-colored base material, it is considered preferable to apply a white ink composition in advance on a region of a recording medium where a color ink composition is to be applied, thereby providing the so-called white backing Such a white ink composition is required to have high concealability.

As a white pigment having high concealability, titanium dioxide is known.

Titanium dioxide, however, tends to precipitate, and once precipitated, it is difficult to re-disperse the substance. Thus, there has been proposed a white ink composition that facilitates re-dispersing of titanium dioxide even when it precipitates and hardly causes clogging of nozzles of a recording head in an inkjet recording apparatus (for example, see Japanese Patent Application Laid-Open (JP-A) No. 2008-308692 and JP-A No. 2012-97214).

On the other hand, in an ink composition for inkjet recording including a magenta pigment or a cyan pigment, in order to reduce coagulation of the pigment, there has been proposed a technique of adding a natural or synthetic smectite clay mineral (JP-A No. 2004-190032).

SUMMARY OF THE INVENTION

White ink used for inkjet printing has insufficient viscosity to suppress the precipitation of titanium dioxide. Accordingly, various stirring mechanisms and circulation mechanism are used. However, in the case of an inkjet printer without any circulation mechanism, when a pigment, once precipitated, has solidified at bottom, it has been difficult to re-disperse the pigment by stirring.

Titanium dioxide having high concealability as a white pigment has an average primary particle diameter of 200 nm or more, thus causing the clogging of recording head nozzles even by a small coagulation. Thus, for maintenance of recording head nozzles, the frequency of cleaning the nozzles needs to be increased, and a white ink composition having more excellent re-dispersibility has been desired.

The present invention has been accomplished in view of the above circumstances. The present invention provides a white ink composition for inkjet recording that may allow the formation of an image excellent in concealability and have excellent re-dispersibility and excellent nozzle maintainability, an ink set for multilayer formation including the white ink composition and a color ink composition including a colorant of a hue other than white, an image forming method using the white ink composition, and a printed matter having an image formed by the image forming method.

According to an aspect of the invention, a white ink composition for inkjet recording is provided which includes: titanium dioxide having an average primary particle diameter of from 200 nm to 350 nm; a hydrophilic, layered clay mineral; a water-soluble resin; and water.

According to another aspect of the invention, an ink set for multilayer formation is provided which includes: the white ink composition; and at least one ink composition for inkjet recording, including a colorant having a hue other than white.

According to another aspect of the invention, an image forming method is provided which includes: applying the white ink composition to a recording medium; and irradiating the white ink composition applied to the recording medium with an active energy ray.

According to still another aspect of the invention, a printed matter is provided which includes an image formed on a recording medium by the image forming method.

DETAILED DESCRIPTION OF THE INVENTION

Hereinbelow, a description will be given of a white ink composition, an ink set for multilayer formation, an image forming method, and a printed matter according to the invention.

In a case in which the amount of a component in the composition is indicated in the present disclosure, when there are plural substances corresponding to the component in the composition, the indicated amount means the total amount of the plural substances present in the composition, unless specifically stated otherwise. For example, in a case in which the amount of a structural unit (for example, structural unit A) in a polymer is indicated in the present disclosure, when there are plural kinds of structural units corresponding to the structural unit (structural unit A), the indicated amount means a total amount of the plural kind of structural units in the polymer, unless specifically stated otherwise.

An amount of a solid content in the ink composition of the invention means the total mass at 25° C. of all ingredients except for solvent among ingredients included in the ink composition. The solid content in the present specification also includes liquid ingredients such as a low molecular weight ingredient, except for solvent.

In the present specification, a numerical range indicated using "from . . . to . . . " or " . . . to . . . " indicates a range including a numerical value given before "to" as a minimum value and a numerical value given after "to" as a maximum value.

The term "step" in the present disclosure encompasses an independent step, as well as a step that cannot be clearly distinguished from another step but yet achieves the expected effect of the step of interest.

In the present specification, the value of solubility parameter may be referred to as "SP value". The "SP value" used in the invention is a solubility parameter calculated according to the Okitsu method (Setchaku, vol. 38. No. 6 (1994) p6, The Society of Polymer Science, Japan) and represents an estimated value obtained by providing a molar attraction constant and a molar volume to each unit in a molecular structure, which has been proposed by Okitsu. In calculation of the SP value of polymer, the calculation is performed in a state in which carboxylic acid in (meth)acrylic acid is unneutralized. SP values used in the invention are those calculated by the method.

[White Ink Composition for Inkjet Recording]

The white ink composition for inkjet recording according to the invention (hereinafter also referred to as a "white ink composition") includes (a) titanium dioxide having an average primary particle diameter of from 200 nm to 350 nm (hereinafter also referred to as "specific titanium oxide"), (b) a hydrophilic, layered clay mineral, (c) a water-soluble resin, and (d) water.

The white ink composition according to the invention contains, in addition to the (c) water-soluble resin, the (b) hydrophilic, layered clay mineral. Accordingly, as compared to white ink compositions that do not include the (b) hydrophilic, layered clay mineral, the white ink composition of the invention has functional effects of exhibiting excellent re-dispersibility and maintainability. How this effect is achieved is uncertain, but it is assumed to be as follows: due to the interaction between the specific clay mineral and the water-soluble resin which coats a particle surface of the specific titanium oxide, mutual coagulation between the individual particles is reduced, and even once precipitation has occurred, the interaction is maintained, thereby suppressing the production of a hard cake of the precipitated specific titanium oxide and facilitating re-dispersing thereof.

[(a) Specific Titanium Oxide]

The specific titanium oxide represents a general term of many titanium dioxide particles that have an average primary particle diameter of from 200 nm to 350 nm.

The surface of the titanium dioxide particles are preferably at least partially, and more preferably entirely, coated with aluminium hydroxide or aluminium oxide.

The average primary particle diameter is measured by directly photographing titanium oxide through an electron microscope (JEM-1200FX, manufactured by Nippon Electronics Co., Ltd.) at magnifications of from 10,000 to 100,000 and observing the sizes of particles in the photographed images, and an arithmetic mean value obtained by measuring the sizes of 1000 particles is employed. Herein, the particle diameters are calculated as circle equivalent diameter, namely, diameters of circles having the same area as the photographed particles.

For example, when the particles is elliptic, diameters thereof in longitudinal, transverse, and oblique directions are measured to calculate a mean value of the measurements, whereby a diameter converted into the diameter of the circle can be obtained.

Titanium dioxide particles having the average primary particle diameter of from 200 nm to 350 nm can impart high concealability. When the average primary particle diameter is 200 nm or more, concealability may be improved, and when the diameter is 350 nm or less, clogging of nozzles may be suppressed and maintainability may be improved. The average primary particle diameter of the titanium dioxide is, in terms of excellent concealability and maintainability, preferably from 200 nm to 350 nm, and more preferably from 240 nm to 300 nm.

Preferably, the surface of the titanium dioxide particles are at least partially, and more preferably entirely, coated with aluminium hydroxide or aluminium oxide. By dispersing the titanium dioxide with a water-soluble resin and adding a hydrophilic, layered clay mineral thereto, a white ink composition excellent in re-dispersibility and maintainability can be easily obtained.

The titanium dioxide particles coated with aluminium hydroxide or aluminium oxide may further be surface-treated with Si, Zr, Zn, or an organic substance.

The specific titanium oxide can be obtained as a commercially available product. Examples of the commercially available product include TIPAQUE R-630, CR-680, CR-58, CR-60, CR-90, CR-93, CR-85, CR-90-2, CR-95, R-550, R-930, CR-50-2, and CR-SUPER70 manufactured by Ishihara Sangyo K.K. and JR-301, JR-403, JR-405, JR-603, JR-701, JR-800, JR-805, and JR-806 manufactured by TAYCA Corporation.

A content of the titanium dioxide having the average primary particle diameter of from 200 nm to 350 nm in the white ink composition is preferably from 6% by mass to 50% by mass, and more preferably from 10% by mass to 40% by mass, with respect to the total mass of the white ink composition, from a viewpoint that high concealability and maintainability can be easily maintained. Further preferably, the content of the specific titanium dioxide is in a range of from 10% by mass to 25% by mass.

[(b) Hydrophilic, Layered Clay Mineral]

The hydrophilic, layered clay mineral according to the invention (hereinafter also referred to as "specific clay mineral") serves to effectively suppress the precipitation of the specific titanium oxide and facilitate re-dispersing even if precipitation occurs. Accordingly, the white ink composition according to the invention hardly causes the clogging of nozzles of ejection head and greatly improves maintainability.

While how such a functional effect is achieved is uncertain, it is assumed that due to the interaction between the specific titanium oxide, the water-soluble resin, and the specific clay mineral, the mutual coagulation between the individual particles of the specific titanium oxide is reduced, and even once precipitation has occurred, the interaction is maintained, whereby the production of a hard cake of the precipitated specific titanium oxide is suppressed and re-dispersing thereof is facilitated. This is also supported by the fact that in white ink compositions not including the specific clay mineral, re-dispersibility is extremely deteriorated and also maintainability is deteriorated, as shown in Comparative Examples described below.

Preferable examples of the specific clay mineral include a smectite clay mineral.

The specific clay mineral is not particularly limited and examples thereof include smectite, montmorillonite, saponite, hectorite, beidellite, nontronite, sauconite, stevensite, and bentonite.

In a preferable embodiment, a smectite clay or a hectorite clay may be used.

As such a specific clay mineral, a commercially available product can be used. Examples of the commercially available product suitably used include SUMECTON SA (trade name, manufactured by Kunimine Industries Co., Ltd., average particle diameter: 20 nm, degree of water swelling: 15, aspect ratio: 20), LUCENTITE SWN (trade name, manufactured by CO-OP Chemical Co., Ltd., average particle diameter: 0.02 µm, degree of water swelling: 15, aspect ratio: 250), and LUCENTITE SWF (trade name, manufactured by CO-OP Chemical Co., Ltd., average particle diameter: 0.02 µm, degree of water swelling: 15, aspect ratio: 250).

In addition, LAPONITE RDS (trade name, manufactured by Rockwood Co., Ltd.) and the like as synthetic hectorite are also suitably used. These have a three-layer structure, which extends two-dimensionally to form small plate-like particles. Primary particles of LAPONITE are extremely minute disk-shaped particles, whereas particles of natural hectorite are rectangular plate-shaped particles. A length of one side of the plate surface is from 400 nm to 500 nm and the aspect ratio thereof is from 20 to 40.

By using the particles having a size of 100 nm or less as described above, the clogging of nozzles of ejection head may be effectively suppressed.

A content of the specific clay mineral is preferably from 0.1% by mass to 4% by mass with respect to a total mass of the white ink composition in terms of obtaining a white ink composition excellent in re-dispersibility and maintainability. The content of the specific clay mineral is more preferably from 0.1% by mass to 2% by mass and further preferably from 0.5% by mass to 1.25% by mass, in terms of having an advantage of obtaining a white ink composition excellent in re-dispersibility and maintainability even when stored for a longer period of time.

[(c) Water-Soluble Resin]

The water-soluble resin according to the invention (hereinafter also referred to as "specific water-soluble resin") serves to maintain the state of the specific titanium dioxide having an average primary particle diameter of from 200 nm to 350 nm such that the titanium dioxide is in a stably dispersed state in the white ink composition for a long period of time. The expression of "water-soluble" in the "water-soluble resin" means that the resin can be dissolved in water at 25° C. to achieve a mass percentage of the dissolved resin of 10% by mass or more.

The water-soluble resin can be a known dispersant and examples thereof include anionic, cationic, and nonionic acryl copolymers and block copolymers. From the viewpoint of dispersion stability, the water-soluble resin is preferably an ionic adsorbing group-containing polymer having an acid value and/or an amine value. The resin is preferably an acrylic copolymer or a block copolymer, and further preferably a block copolymer. The acid value of the water-soluble resin is preferably 10 mgKOH/g or more, and is more preferably from 10 mgKOH/g to 50 mgKOH/g.

The specific water-soluble resin may be a commercially available product. Examples thereof include: DISPERBYK-183, DISPERBYK-2015, DISPERBYK-190, DISPERBYK-192, DISPERBYK-194, and BYK-154, and DISPERBYK-2090 (trade names, manufactured by BYK-Chemie Co. Ltd.); SOLSPERSE 41000, SOLSPERSE 43000, SOLSPERSE 44000, and SOLSPERSE 47000 (trade names, manufactured by Lubrizol Corporation Ltd.); and DEMOL EP and POISE 520 (trade names, manufactured by Kao Corporation). These have an excellent ability to disperse the specific titanium oxide and thus are preferably used.

Among those, it is preferable to include a resin having a branched structure. One or more of resins having a branched structure can be included. The resin having a branched structure is more preferably an organic polymer dispersant having a main chain including an adsorbing group for adsorbing to the specific titanium oxide and having at least one hydrophilic side chain. Examples of the main chain of the dispersant include polyethylene, polyolefin, polystyrene, polyester, polyurethane, polyamide, polyvinyl acetate, acrylic resin, and copolymers having structural units thereof. Examples of the adsorbing group of the main chain of the dispersant include a carboxyl group, a sulfo group, a phosphoric acid group, and an amino group, and a carboxyl group is particularly desirable. Examples of the side chain of the dispersant include polyether, polyvinyl alcohol, and polyvinyl pyrrolidone, which are hydrophilic. The dispersant may have a single side chain or plural side chains, and may have one kind of side chain or two or more kinds of side chains.

The dispersant having a branched structure can be used by selecting from those used as dispersants for solid particles. Examples of such a dispersant suitably used include a dispersant commercially available as "DISPERBYK-190" (described above). The "DISPERBYK-190" is a dispersant having a branched structure that includes, as the main chain, an acrylic resin having a carboxyl group as an adsorbing group and includes, as plural side chains, hydrophilic polyether and hydrophobic polystyrene.

Regarding a content of the specific water-soluble resin, a ratio of a content of the specific water-soluble resin to a content of the specific titanium oxide in terms of mass is preferably in a range of from 1/100 to 20/100 from the viewpoint of maintaining the specific titanium oxide and the specific clay mineral in a stably dispersed state for a long period of time. In addition, from the viewpoint of obtaining a white ink composition excellent in re-dispersibility and maintainability, the ratio is more preferably in a range of from 3/100 to 20/100, and further preferably in a range of from 6/100 to 15/100.

[(d) Water]

The white ink composition according to the invention includes water as a solvent.

Preferable examples of the water to be used include deionized water and distilled water, which are free from impurities.

A content of the water is preferably from 30% by mass to 95% by mass, more preferably from 40% by mass to 90% by mass, and still more preferably from 50% by mass to 85% by mass, with respect to a total mass of the white ink composition.

The white ink composition according to the invention including the specific titanium dioxide, the specific clay mineral, the specific water-soluble resin, and the water is preferably a curable white ink composition that further includes (e) a water-soluble polymerizable compound and (f) a polymerization initiator, since excellent re-dispersibility and maintainability are exhibited thereby. Hereinbelow, a description will be given regarding the water-soluble polymerizable compound and the polymerization initiator.

[(e) Water-Soluble Polymerizable Compound]

The water-soluble polymerizable compound is water-soluble and preferably includes at least one (meth)acryloyl group. Herein, the "(meth)acryloyl group" means an acryloyl group, a methacryloyl group, or both thereof. Similarly, "(meth)acrylamide" means acrylamide, methacrylamide, or both thereof "(meth)acrylic acid" means acrylic acid, methacrylic acid, or both thereof and "(meth)acrylate" means acrylate, methacrylate, or both thereof.

In addition, the expression of "water-soluble" in the "water-soluble polymerizable compound" means that the compound can be dissolved in water at 25° C. to achieve a mass percentage of the dissolved compound of 10% by mass or more.

The water-soluble polymerizable compound suitable in the white ink composition according to the invention includes a (meth)acrylamide compound. Particularly suitable is at least one (meth)acrylamide compound represented by the following Formula (2).

Hereinbelow, the (meth)acrylamide compound represented by Formula (2) will be also referred to simply as "compound represented by Formula (2)".

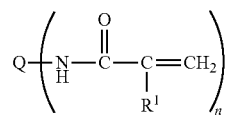

Formula (2)

In Formula (2), Q represents an n-valent group and $R^1$ represents a hydrogen atom or a methyl group. n represents an integer of 1 or more. When n represents an integer of 2 or more, $R^1$ included in a group parenthesized with n may be the same or different.

The compound represented by Formula (2) is a compound in which an unsaturated vinyl monomer is bonded to the group Q via an amide bond.

A compound of Formula (2) in which n represents 1 is a monofunctional (meth)acrylamide compound having one (meth)acrylamide structure in one molecule thereof. A compound of Formula (2) in which n represents an integer of 2 or more is a multifunctional (meth)acrylamide compound having two or more (meth)acrylamide structures in one molecule thereof.

In Formula (2), $R^1$ preferably represents a hydrogen atom.

The valence number n of the group Q is 1 or more, and is preferably from 1 to 6, more preferably from 1 to 4, and particularly preferably from 1 to 3, from the viewpoint of improving permeability, polymerization efficiency, and ejection stability.

In Formula (2), when n represents 1, the group Q is not particularly limited as long as it is a monovalent group that can be linked to the (meth)acrylamide structure. The group Q when n represents 1 is preferably selected from groups having water-solubility. Specific examples of the groups include monovalent residues obtained by removing one or more hydroxy groups from compounds selected from the following compound group X.

(Compound Group X)

Ethylene glycol, diethylene glycol, triethylene glycol, polyethylene glycol, propylene glycol, dipropylene glycol, tripropylene glycol, polypropylene glycol, 1,3-propane diol, 1,2-butane diol, 1,3-butane diol, 1,4-butane diol, 2,3-butane diol, 1,5-pentane diol, 1,4-pentane diol, 2,4-pentane diol, 3-methyl-1,5-pentane diol, 2-methyl-2,4-pentane diol, 1,5-hexane diol, 1,6-hexane diol, 2,5-hexane diol, glycerin, 1,2,4-butane triol, 1,2,6-hexane triol, 1,2,5-pentane triol, thioglycol, trimethylolpropane, ditrimethylolpropane, trimethylolethane, ditrimethylolethane, neopentylglycol, pentaerythritol, dipentaerythritol, condensates thereof, polyol compounds such as low-molecular polyvinyl alcohol or sugars, and polyamine compounds such as ethylene diamine, diethylene triamine, triethylene tetramine, polyethylene imine, and polypropylene diamine.

When n represents an integer of 2 or more, examples of the group Q include substituted or unsubstituted alkylene groups having 4 or less carbon atoms such as a methylene group, an ethylene group, a propylene group, and a butylene group, divalent or higher-valent linking groups having a saturated or unsaturated hetero ring (such as a pyridine ring, an imidazole ring, a pyrazine ring, a piperidine ring, a piperazine ring, or a morpholine ring), divalent or higher-valent residues of polyol compounds including an oxyalkylene group (preferably an oxyethylene group), and divalent or higher-valent residues of polyol compounds including three or more oxyalkylene groups (preferably oxyethylene groups).

The compound represented by Formula (2) to be used can be appropriately selected, for example, from water-soluble polymerizable compounds described in JP-A No. 2010-69805, JP-A No. 2011-46872, JP-A No. 2011-178896, JP-A No. 2011-174013, and JP-A No. 2011-195822.

Among compounds represented by Formula (2), particularly preferred is a (meth)acrylamide compound represented by the following Formula (3):

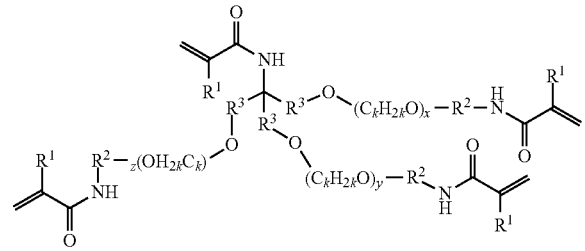

Formula (3)

In Formula (3), each of multiple $R^1$s independently represents a hydrogen atom or a methyl group, and each of multiple $R^2$s independently represents a linear or branched alkylene group having from 2 to 4 carbon atoms, with the proviso that an oxygen atom and a nitrogen atom, which are bonded to $R^2$, are not bonded to the same carbon atom in $R^2$. Each of multiple $R^3$s independently represents a divalent linking group; k represents 2 or 3; x, y, and z each independently represent an integer of 0 to 6; and x+y+z is from 0 to 18.

The (meth)acrylamide compound represented by Formula (3) (hereinafter also referred to as "specific (meth)acrylamide compound") is a tetrafunctional (meth)acrylamide compound having four (meth)acrylamide structures in one molecule thereof.

The specific (meth)acrylamide compound exhibits curability based on polymerization reaction by application of energy, such as heat or an active energy ray such as alpha ray, gamma ray, X ray, ultraviolet light, visible ray, infrared ray, or electron beam, thereby improving abrasion resistance and scratch resistance. Furthermore, the specific (meth)acrylamide compound is water-soluble and favorably dissolved in water or water-soluble organic solvents such as alcohol.

The specific (meth)acrylamide compound is more excellent in solubility in water and polymerization efficiency than other tetrafunctional or higher functional polymerizable compounds (for example, tetrafunctional or higher functional (meth)acrylamide compounds other than the specific (meth)acrylamide compound). Moreover, gloss unevenness and cracking after curing may be suppressed.

How the gloss unevenness and cracking after curing is suppressed is assumed to be that the inclusion of the specific (meth)acrylamide compound represented by Formula (3) in the ink composition increases the viscosity of the ink composition in a state of being dried after applied onto a recording medium.

In Formula (3), $R^1$ represents a hydrogen atom or a methyl group and preferably represents a hydrogen atom. Plural $R^1$s may be the same as or different from each other.

$R^2$ represents a linear or branched alkylene group having from 2 to 4 carbon atoms. Plural $R^2$s may be the same as or different from each other. $R^2$ preferably represents an alkylene group having 3 or 4 carbon atoms, more preferably represents an alkylene group having 3 carbon atoms, and particularly preferably represents a linear alkylene group having 3 carbon atoms. The alkylene group of $R^2$ may further include a substituent and examples of the substituent include an aryl group and an alkoxy group.

However, in Formula (3), an oxygen atom and a nitrogen atom which are bonded to $R^2$ are not bonded to the same carbon atom of $R^2$. $R^2$ represents a linear or branched alkylene group linking the oxygen atom to the nitrogen atom of the (meth)acrylamide group. Herein, when the alkylene group has a branched structure, there is a possibility that the group has an —O—C—N— structure (a hemiaminal structure) in which the oxygen atom and the nitrogen atom of the (meth)acrylamide group at both ends thereof are bonded to the same carbon atom in the alkylene group. However, the compound represented by Formula (3) does not include a compound having such a structure. Compounds having the —O—C—N— structure in a molecule thereof easily cause decomposition at a position of the carbon atom and thus are easily decomposed during storage. Accordingly, when such a compound is included in the ink composition, storage stability may be reduced.

$R^3$ represents a divalent linking group and plural $R^3$s may be the same as or different from each other. Examples of the divalent linking group represented by $R^3$ include an alkylene group, an arylene group, a heterocyclic group, and a group consisting of any of combinations thereof. Preferred is an alkylene group. When the divalent linking group includes an alkylene group, at least one selected from the group consisting of —O—, —S—, and —NR$^a$— may be present between C—C bonds other than the ends of the alkylene group. $R^a$ represents a hydrogen atom or an alkyl group having 1 to 4 carbon atoms.

When $R^3$ includes an alkylene group, examples of the alkylene group include a methylene group, an ethylene group, a propylene group, a butylene group, a pentylene group, a hexylene group, a heptylene group, an octylene group, and a nonylene group. The alkylene group of $R^3$ has preferably 1 to 6 carbon atoms, more preferably 1 to 3 carbon atoms, and particularly preferably 1 carbon atom. Additionally, at least one selected from the group consisting of —O—, —S—, and —NR$^a$— may be present between C—C bonds other than the ends of the alkylene group of $R^3$. Examples of an alkylene group including —O— include —C$_2$H$_4$—O—C$_2$H$_4$— and —C$_3$H$_6$—O—C$_3$H$_6$—. The alkylene group of $R^3$ may further include a substituent and examples of the substituent include an aryl group and an alkoxy group.

When $R^3$ includes an arylene group, examples of the arylene group include a phenylene group and a naphthylene group. The arylene group of $R^3$ has preferably 6 to 14 carbon atoms, more preferably 6 to 10 carbon atoms, and particularly preferably 6 carbon atoms. The arylene group of $R^3$ may further include a substituent and examples of the substituent include an aryl group and an alkoxy group.

When $R^3$ includes a heterocyclic group, the heterocyclic group is preferably a 5- or 6-membered heterocyclic group, which may be condensed. In addition, the heterocycle may be an aromatic heterocycle or a non-aromatic heterocycle. Examples of the heterocyclic group include pyridine, pyrazine, pyrimidine, pyridazine, triazine, quinoline, isoquinoline, quinazoline, cinnoline, phthalazine, quinoxaline, pyrrole, indole, furan, benzofuran, thiophene, benzothiophene, pyrazole, imidazole, benzimidazole, triazole, oxazole, benzoxazole, thiazole, benzothiazole, isothiazole, benzisothiazole, thiadiazole, isoxazole, benzisoxazole, pyrrolidine, piperidine, piperazine, imidazolidine, and thiazoline. Among them, preferred are aromatic heterocyclic groups, and pyridine, pyrazine, pyrimidine, pyridazine, triazine, pyrazole, imidazole, benzimidazole, triazole, thiazole, benzothiazole, isothiazole, benzisothiazole, and thiadiazole are preferable.

The exemplified heterocyclic groups are given in a form in which the substitution position is omitted. The heterocyclic group may have a substituent. The substitution position is not limited, and for example, in the case of pyridine, it may have a substituent at any of positions 2, 3, and 4. Those having such a substituent are also included in the scope of the respective heterocyclic group listed above.

Examples of the substituent include an alkyl group, an aryl group, and an alkoxy group.

In Formula (3), k represents 2 or 3. The plural ks may be the same as or different from each other as long as k is the same integer in each $C_kH_{2k}O$ unit. $C_kH_{2k}$ may have a linear structure or a branched structure.

In addition, x, y, and z each independently represent an integer of 0 to 6, preferably an integer of 0 to 5, and more preferably 0 to 3; and x+y+z is from 0 to 18, preferably from 0 to 15, and more preferably from 0 to 9.

Among those described above, preferred is a compound in which $R^1$ represents a hydrogen atom or a methyl group; $R^2$ represents an alkylene group having 2 to 4 carbon atoms; $R^3$ represents an alkylene group having 1 to 6 carbon atoms (preferably 1 to 3 carbon atoms); k represents 2 or 3; x, y, and z each independently represent an integer of 0 to 6; and x+y+z is from 0 to 15.

Specific examples of the compound represented by Formula (3) will be given below. However, the invention is not limited to the examples.

Polymerizable compound a

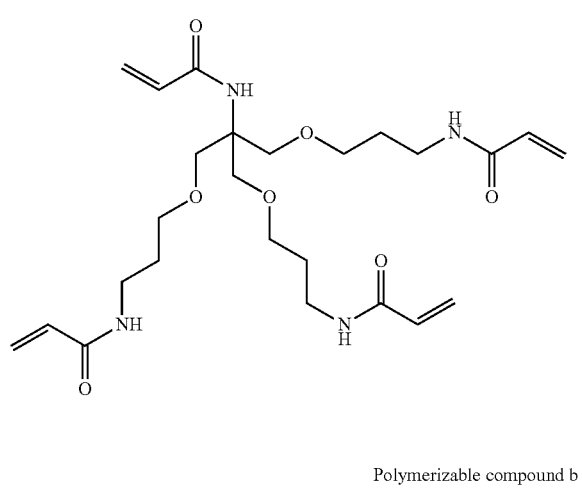

Polymerizable compound b

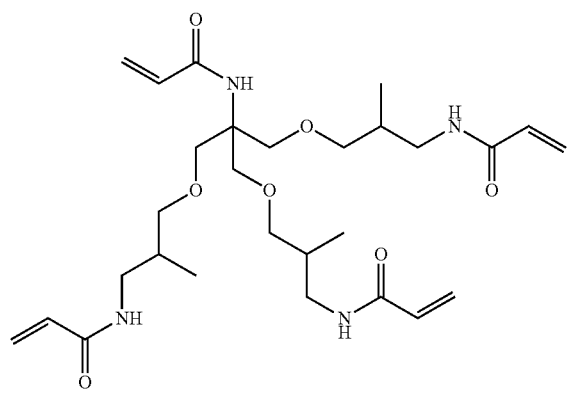

Polymerizable compound c

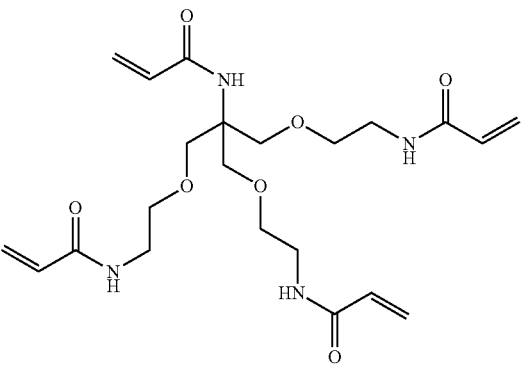

Polymerizable compound d

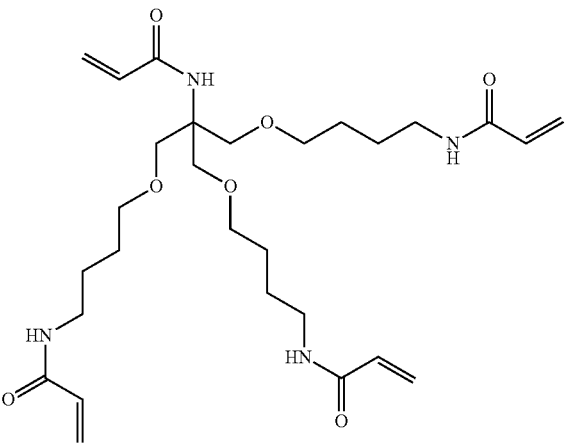

Polymerizable compound e

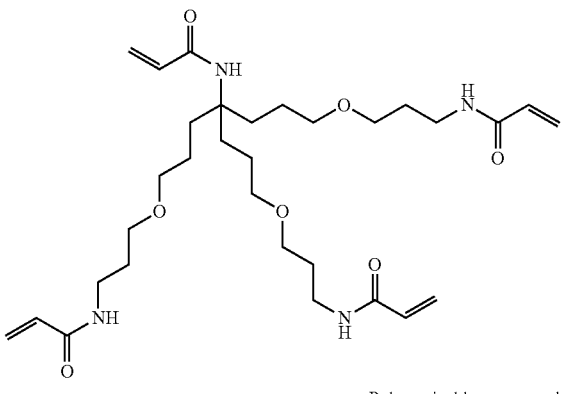

Polymerizable compound f

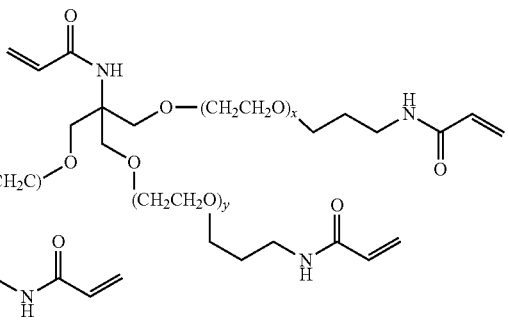

x + y + z = 9

The method for synthesizing the compound represented by Formula (3) is not particularly limited. For example, the compound represented by Formula (3) can be synthesized by a method described in paragraphs 0028 to 0033 and paragraphs 0123 to 0139 in JP-A No. 2013-18846.

A content of the specific (meth)acrylamide compound included in the white ink composition is preferably from 10% by mass to 50% by mass, more preferably from 15% by mass to 40% by mass, and still more preferably from 20% by mass to 30% by mass, with respect to a total amount of the ink composition.

By including the compound at the content of the above range, the uniformity of viscosity of the ink composition dried on a recording medium may be further improved, so that the effects of suppressing image cracking and suppressing gloss unevenness may be more effectively obtained.

[(f) Polymerization Initiator]

The polymerization initiator serves to initiate the polymerization of the water-soluble polymerizable compound by an active energy ray.

The polymerization initiator to be used may be a single one or a combination of two or more polymerization initiators. Additionally, the polymerization initiator may be used in combination with a sensitizer.

The polymerization initiator can include a compound capable of initiating a polymerization reaction of a polymerizable compound by an active energy ray, which is appropriately selected. Examples of the polymerization initiator include polymerization initiators (for example, photopolymerization initiators and the like) generating active species (such as radicals, acids, and bases) by radiation, light, or electron beam.

Examples of the photopolymerization initiators include acetophenone, 2,2-diethoxyacetophenone, p-dimethyl amino acetophenone, p-dimethyl amino propiophenone, benzophenone, 2-chloro benzophenone, p,p'-dichloro-benzophenone, p,p'-bis-diethylamino benzophenone, Michler ketone, benzyl, benzoin, benzoin methyl ether, benzoin ethyl ether, benzoin isopropyl ether, benzoin n-propyl ether, benzoin isobutyl ether, benzoin n-butyl ether, benzyl dimethyl ketal, tetramethylthiuiram monosulfide, thioxanthone, 2-chloro thioxanthone, 2-methyl thioxanthone, azobisisobutylnitrile, benzoin peroxide, di-tert-butyl peroxide, 1-hydroxycyclohexyl phenyl ketone, 1-[4-(2-hydroxy-ethoxy)-phenyl]-2-hydroxy-2-methyl-1-propane-1-one, 2-hydroxy-2-methyl-1-phenyl-1-one, 1-(4-isopropyl-phenyl)-2-hydroxy-2-methyl propane-1-one, and methylbenzoyl formate. In addition, examples thereof include aromatic diazonium salts, aromatic halonium salts, aromatic sulfonium salts, and metallocene compounds, such as triphenylsulfonium hexafluorophosphate and diphenyliodonium hexafluoroantimonate.

A content of the polymerization initiator in the ink composition is preferably from 1% by mass to 10% by mass, and more preferably from 1% by mass to 4% by mass, with respect to a total amount of the white ink composition including the water-soluble polymerizable compound. When the content of the polymerization initiator is 1% by mass or more, the scratch resistance of images may be further improved, which is advantageous in terms of high speed recording. In addition, a content of 4% by mass or less may be advantageous in terms of stability of the ink composition.

[(g) Polymer compound Including (g-1) Repeating Unit Having Partial Structure Represented by Formula (1) and (g-2) Repeating Unit Having Hydrophilic Group]

Preferably, the white ink composition according to the invention further includes a polymer compound including: a (g-1) repeating unit having a partial structure represented by Formula (1) below; and a (g-2) repeating unit having a hydrophilic group.

Formula (1)

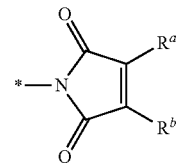

(In Formula (1), each of $R^a$ and $R^b$ independently represents a hydrogen atom or an alkyl group having from 1 to 4 carbon atoms. At least one selected from the group consisting of $R^a$ and $R^b$ represents an alkyl group having from 1 to 4 carbon atoms. $R^a$ and $R^b$ may be bonded to each other to form a 4- to 6-membered alicyclic structure. The asterisk * represents a site bonding to a main chain or a side chain of the polymer compound).

In the present specification, the polymer compound including a (g-1) repeating unit having a partial structure represented by Formula (1) and a (g-2) repeating unit having a hydrophilic group is also referred to as a "specific copolymer".

The white ink composition according to the invention including the specific copolymer can form images excellent in film strength and blocking resistance.

Blocking is a phenomenon of undesired adhesion between images on surface sides of printed matters or between an image on a surface side of a printed matter and an image on a back side of another printed matter, which may occur when printed matters (recording media with images formed thereon) are layered. The blocking resistance is the property of suppressing the occurrence of such undesired adhesion. One major characteristic of images formed by the white ink composition of the invention may be that the images can achieve excellent blocking resistance even under conditions of high temperatures of from 80° C. to 100° C.

Although the mechanism of action of the invention is uncertain, the present inventors think as follows.

Since the specific copolymer according to the invention includes the repeating unit (g-1), an effect of crosslinking due to the partial structure represented by Formula (1) and an effect of insolubility due to the improvement of polarity can both be obtained. In addition, since the specific copolymer includes the repeating unit (g-2), the SP value of the specific copolymer can be controlled within a preferable range and thereby the solvent resistance of formed images is improved. Further, the crosslinking effect due to the partial structure represented by Formula (1) may improve the blocking resistance of the formed images.

In addition, by inclusion of the specific clay mineral, the formed images have high concealability, and also, the specific copolymer including the repeating unit (g-1) serves to cause a secondary effect of suppressing image blurring in a case in which the white ink composition has been applied on a recording medium.

[(g) Specific Copolymer]

Hereinbelow, a detailed description will be given of the physical properties of the specific copolymer as well as the individual repeating units included in the specific copolymer.

((g-1) Repeating Unit Having Partial Structure Represented by Formula (1))

The specific copolymer includes: (g-1) a repeating unit having the partial structure represented by Formula (1) below; and (g-2) a repeating unit having a hydrophilic group.

Formula (1)

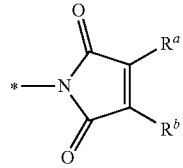

(1)

In Formula (1), each of $R^a$ and $R^b$ independently represents a hydrogen atom or an alkyl group having from 1 to 4 carbon atoms. At least one selected from the group consisting of $R^a$ and $R^b$ represents an alkyl group having from 1 to 4 carbon atoms. $R^a$ and $R^b$ may be bonded to each other to form a 4- to 6-membered alicyclic structure. The asterisk * represents a site bonding to a main chain or a side chain of the polymer compound.

In Formula (1), the alkyl group having 1 to 4 carbon atoms represented by $R^a$ or $R^b$ may have a linear structure or a branched structure. Specific examples of the alkyl group include a methyl group, an ethyl group, a propyl group, an isopropyl group, a butyl group, an isobutyl group a sec-butyl group, and a t-butyl group. Among these alkyl groups, preferred are alkyl groups having 1 or 2 carbon atoms (methyl and ethyl groups), and particularly preferred is a methyl group.

In Formula (1), the alkyl group having 1 to 4 carbon atoms represented by $R^a$ or $R^b$ may have or not have a substituent, but preferably the alkyl group does not have any substituent.

$R^a$ and $R^b$ may be bonded to each other to form a 4- to 6-membered alicyclic ring structure.

Preferably, $R^a$ and $R^b$ respectively represent an alkyl group having 1 to 4 carbon atoms or $R^a$ and $R^b$ are bonded to each other to form a 4- to 6-membered alicyclic ring structure. More preferably, $R^a$ and $R^b$ respectively represent an alkyl group having 1 or 2 carbon atoms, and still more preferably, $R^a$ and $R^b$ respectively represent a methyl group.

The followings are specific examples of the partial structure represented by Formula (1). However, the invention is not limited thereto.

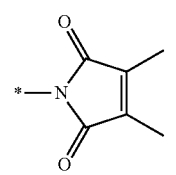

(I-1)

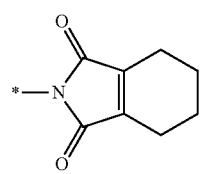

(I-2)

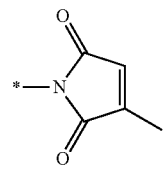

(I-3)

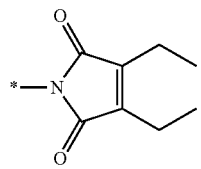

(I-4)

The specific copolymer may have the partial structures represented by Formula (1) in plurality at its side chain.

The repeating unit (g-1) is preferably a repeating unit represented by Formula (4) below.

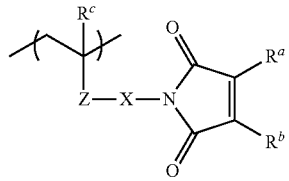

(4)

In Formula (4), $R^a$ and $R^b$ each independently represent a hydrogen atom or an alkyl group having 1 to 4 carbon atoms, and at least one selected from the group consisting of $R^a$ and $R^b$ represents an alkyl group having 1 to 4 carbon atoms. $R^a$ and $R^b$ may be bonded to each other to form a 4- to 6-membered alicyclic ring structure. $R^c$ represents a hydrogen atom or a methyl group. Z represents a single bond, —COO— or —CONR$^d$—, in which $R^d$ represents a hydrogen atom or an alkyl group having 1 to 4 carbon atoms, and the asterisks ** represents a site bonding to X. X represents a divalent organic group.

In Formula (4), $R^a$ and $R^b$ each independently represent a hydrogen atom or an alkyl group having 1 to 4 carbon atoms and at least one selected from the group consisting of $R^a$ and $R^b$ represents an alkyl group having 1 to 4 carbon atoms. $R^a$ and $R^b$ may be bonded to each other to form a 4- to 6-membered alicyclic ring structure.

$R^a$ and $R^b$ in Formula (4) respectively have the same meanings as $R^a$ and $R^b$ respectively in Formula (1) and the preferable ranges are also the same.

In Formula (4), $R^c$ represents a hydrogen atom or a methyl group. Preferably, $R^c$ represents a methyl group.

In Formula (4), preferably, Z represents a single bond, —COO— or —CONR$^d$—, in which $R^d$ represents a hydrogen atom or an alkyl group having 1 to 4 carbon atoms and the asterisks  represents a site bonding to X. Preferably, Z represents-COO—.

$R^d$ in —CONR$^d$—** represents a hydrogen group or an alkyl group having 1 to 4 carbon atoms. The alkyl group having 1 to 4 carbon atoms represented by $R^d$ may have a linear structure or a branched structure. Specific examples of the alkyl group include a methyl group, an ethyl group, a propyl group, an isopropyl group, a butyl group, an isobutyl group, a sec-butyl group, and a t-butyl group. Preferably, $R^d$ represents a hydrogen atom or an alkyl group having 1 to 2 carbon atoms, which is namely a methyl group or an ethyl group. Particularly preferably, $R^d$ represents a hydrogen atom. When $R^d$ represents an alkyl group, the alkyl group may have or not have a substituent, but preferably the alkyl group does not have any substituent.

In Formula (4), X represents a divalent organic group. The divalent organic group is an alkylene group or an aralkylene group. Preferred is an alkylene group having 2 to 20 carbon atoms or an aralkylene group having 6 to 12 carbon atoms. More preferably, X represents an alkylene group.

When X represents an alkylene group, the alkylene group preferably has 2 to 20 carbon atoms, more preferably has 2 to 12 carbon atoms, and still more preferably has 2 to 8 carbon atoms. When the number of carbon atoms in the alkylene group represented by X is within the above range, mobility of the partial structure represented by Formula (4) present at the end of side chain in the specific copolymer is improved, thereby further improving the effects of the invention.

A structure of the alkylene group represented by X may be linear, branched in the alkylene chain, or cyclic. In addition, the alkylene group may include a bond selected from the group consisting of —O—, COO—, —OC(=O)—, and —CONH— in the alkylene chain. In addition, the alkylene group may be substituted with an alkyl group having 4 or less carbon atoms, a hydroxyl group, or a chlorine atom.

Preferably, the repeating unit represented by Formula (4) is an alkylene group in which $R^a$ and $R^b$ each independently represent an alkyl group having 1 to 2 carbon atoms; $R^c$ represents a methyl group; Z represents —COO—**; and X represents an alkylene group having 2 to 12 carbon atoms.

The specific copolymer may include only one or two or more repeating units (g-1).

The repeating unit (g-1) can be introduced in the specific copolymer by copolymerization using a monomer having the partial structure represented by Formula (1) used as one of copolymerized components. When the repeating unit (g-1) is the repeating unit represented by Formula (4), the specific copolymer can be synthesized using a monomer represented by Formula (4') below.

Alternatively, the repeating unit (g-1) can be introduced in the specific copolymer by a method using a polymer reaction. Examples of such a method include a method including reacting a prepolymer having a primary amino group with a corresponding anhydride and a method including reacting a prepolymer with a compound having a functional group that reacts with a functional group in the prepolymer to form a bond and a partial structure represented by Formula (1).

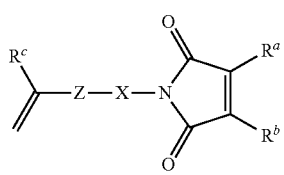

(4')

In Formula (4'), $R^a$, $R^b$, $R^c$, Z, and X respectively have the same meanings as $R^a$, $R^b$, $R^c$, Z, and X respectively in Formula (4) and preferable ranges are also the same.

Preferable examples of the monomer represented by Formula (4') include monomers (4'-1) to (4'-11) given below. However, the invention is not limited thereto.

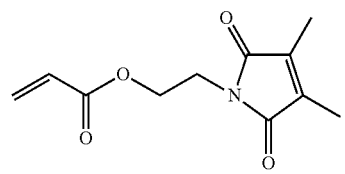
(4'-1)

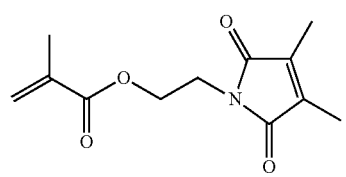
(4'-2)

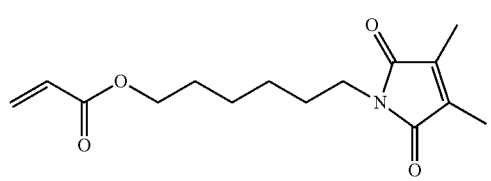
(4'-3)

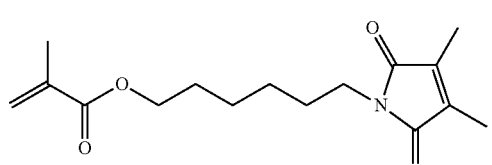
(4'-4)

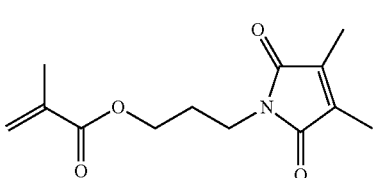
(4'-5)

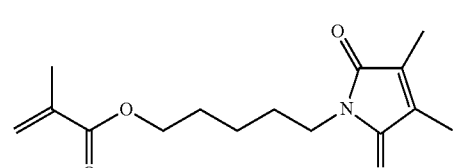
(4'-6)

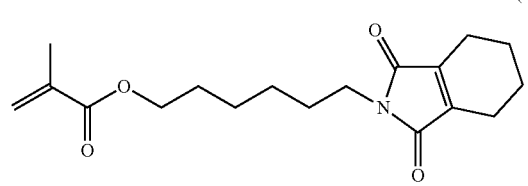
(4'-7)

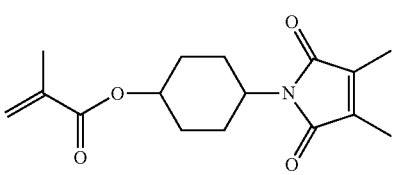
(4'-8)

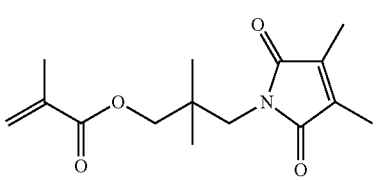
(4'-9)

-continued

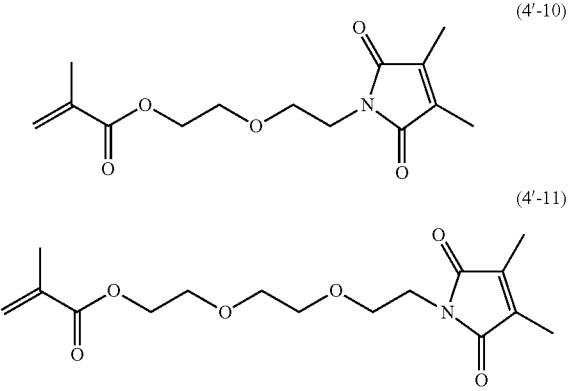

(4'-10)

(4'-11)

Monomers including a partial structure represented by Formula (1), representatives of which including the monomers (4'-1) to (4'-11), can be produced by, for example, methods described in JP-A No. S52-988 and JP-A No. H4-251258.

A content of the repeating unit (g-1), which is preferably the repeating unit represented by Formula (4), in in the specific copolymer is appropriately selected in accordance with properties intended for a cured film (image) formed by the ink composition. Particularly, the content of the repeating unit (g-1) ispreferably from 20% by mass to 70% by mass, more preferably from 30% by mass to 70% by mass, and still more preferably from 40% by mass to 60% by mass, with respect to the total mass of the specific copolymer from the viewpoint of the strength and flexibility of a formed image.

Too much or too little of the content tends to reduce the strength of images. In order to form an ink image excellent in flexibility, a smaller content within the above range is preferable.

((g-2) Repeating Unit Having Hydrophilic Group)

The specific copolymer in the invention includes the repeating unit (g-2).

The hydrophilic group is not particularly limited as long as it is a group having a function of increasing hydrophilicity of the specific copolymer. The hydrophilic group may be a nonionic hydrophilic group or an ionic hydrophilic group (for example, anionic hydrophilic group or a cationic hydrophilic group).

The nonionic hydrophilic group is not particularly limited. Examples of the nonionic hydrophilic group include a residue obtained by removing one hydrogen atom from a heterocyclic structure including a nitrogen atom or an oxygen atom, an amide group, a carbamoyl group, an alkyl-substituted carbamoyl group, an alcoholic hydroxyl group, and a group having a polyalkyleneoxy structure.

Examples of the heterocyclic structure in the residue obtained by removing one hydrogen atom from a heterocyclic structure including a nitrogen atom or an oxygen atom include lactones such as γ-butyrolactone, cyclic urea such as 2-pyrrolidone and ethylene urea, cyclic carbonates such as ethylene carbonate and propylene carbonate and cyclic ethers such as tetrahydrofuran and 1,4-dioxane.

The amide group is preferably an amide group having 2 to 10 carbon atoms, in which a hydrogen atom is preferably bonded to a nitrogen atom in the amide group.

Examples of the alkyl-substituted carbamoyl group include: a monoalkyl carbamoyl group in which a hydrogen atom bonded to a nitrogen atom of a carbamoyl group is substituted with an alkyl group; and a dialkyl carbamoyl group in which two hydrogen atoms bonded to a nitrogen atom of a carbamoyl group are substituted with alkyl groups. The alkyl groups may respectively have a substituent such as a hydroxyl group. Among the alkyl-substituted carbamoyl groups, preferred is a monoalkyl carbamoyl group substituted with an alkyl group having 1 to 8 carbon atoms or a hydroxy group-substituted alkyl group having 1 to 4 carbon atoms.

The group having a polyalkyleneoxy structure is not particularly limited. The polyalkyleneoxy structure preferably has an alkyleneoxy group having 1 to 4 carbon atoms in the repeating unit. The alkyleneoxy group in the polyalkyleneoxy structure may be a single kind or a combination of plural kinds thereofs. A terminal group of the polyalkyleneoxy structure is preferably a hydroxyl group or an alkoxy group, and more preferably a hydroxyl group or a methoxy group.

The ionic hydrophilic group is not particularly limited. Examples of the ionic hydrophilic group include a carboxyl group, a sulfo group, a phosphoric acid group, a phosphonic acid group, a phenolic hydroxyl group, and a quaternary ammonium group. The ionic hydrophilic group may be in a state of forming a salt.

When the ionic hydrophilic group is in a state of forming a salt, examples of a counter salt thereof include alkali metal salts (such as Li, Na, and K) and onium salts such as ammonium salts, pyridinium salts, and phosphonium salts. Among them, preferred are alkali metal salts (such as Li, Na, and K) or ammonium salts.

Among the hydrophilic groups, preferred are an amide group, a carbamoyl group, an alkyl-substituted carbamoyl group, an alcoholic hydroxyl group, a group having a polyalkyleneoxy structure, a carboxyl group, a sulfo group, and a salt of any of these, and more preferred are an alcoholic hydroxyl group, an alkyl-substituted carbamoyl group, a carboxyl group, a sulfo group, and a salt of any of these. In addition, particularly preferred are a carboxyl group and a salt thereof.

Preferable example of the repeating unit (g-2) include a repeating unit represented by Formula (5) below.

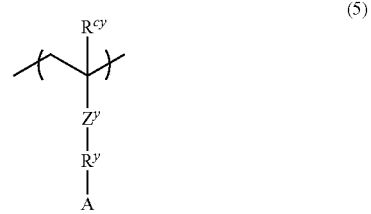

(5)

In Formula (5), $R^{cy}$ represents a hydrogen atom or a methyl group. $Z^y$ represents —COO—*, —CONR$^{dy}$—*, or a single bond, in which $R^{dy}$ represents a hydrogen atom or an alkyl group having 1 to 4 carbon atoms. $R^y$ represents a single bond or a group selected from the group consisting of an alkylene group, an arylene group, and an aralkylene group. A represents a hydrophilic group. Herein, the asterisks *** represent a position where $Z^y$ is bonded to $R^y$.

Formula (5) will be described in detail.

In Formula (5), $R^{cy}$ represents a hydrogen atom or a methyl group.

In Formula (5), $Z^y$ represents —COO—*, —CONR$^{dy}$—*, or a single bond, and preferably represents —COO—*. The asterisks * represent a position where $Z^y$ is bonded to $R^y$.

$R^{dy}$ represents a hydrogen atom or an alkyl group having 1 to 4 carbon atoms. The alkyl group having 1 to 4 carbon atoms may have a linear structure or a branched structure. Specific examples of the alkyl group include a methyl group, an ethyl group, a propyl group, an isopropyl group, a butyl group, an isobutyl group a sec-butyl group, and a t-butyl group. $R^{dy}$ preferably represents a hydrogen atom or an alkyl group having 1 to 2 carbon atoms (namely, a methyl group or an ethyl group), and particularly preferably a hydrogen atom.

$R^{dy}$ may have or not have a substituent, but preferably, $R^{dy}$ does not have any substituent. Examples of a substituent that may be included in $R^{dy}$ include an aryl group having 6 to 8 carbon atoms, an alkoxy group having 1 to 8 carbon atoms, a hydroxyl group, a carboxyl group, and a halogen atom (such as F, Cl, Br, or I).

In Formula (5), $R^y$ represents a single bond or a group selected from the group consisting of, an alkylene group, an arylene group, and an aralkylene group. Preferred is an alkylene group having 1 to 20 carbon atoms, an arylene group having 6 to 20 carbon atoms, or an aralkylene group having 7 to 20 carbon atoms.

When $R^y$ represents a group selected from the group consisting of an alkylene group, an arylene group, and an aralkylene group, these groups may have or not have a substituent. In addition, an alkylene group, an arylene group, or an aralkylene group represented by $R^y$ may include an ether bond, an ester bond, an amide bond, or an urethane bond in the structure thereof.

In Formula (5), preferably, $R^y$ represents a single bond.

When $R^y$ represents a group selected from the group consisting of alkylene groups, arylene groups, and aralkylene groups, these groups may additionally have a substituent. Examples of the substituent include aryl groups having 6 to 8 carbon atoms, alkoxy groups having 1 to 8 carbon atoms, hydroxyl groups, carboxyl groups, and halogen atoms (such as F, Cl, Br, and I).

When $R^y$ represents an alkylene group having 1 to 20 carbon atoms, the alkylene group may have a linear structure, a branched structure, or a cyclic structure. When $R^y$ represents an alkylene group, the number of carbon atoms in the alkylene group is more preferably 2 to 12, and still more preferably 2 to 8. Specific examples of the alkylene group of $R^y$ include —CH$_2$—, —C$_2$H$_4$—, —C(CH$_3$)$_2$—CH$_2$—, —CH$_2$C(CH$_3$)$_2$—, —C$_6$H$_{12}$—, —C$_4$H$_7$(C$_4$H$_9$)C$_4$H$_8$—, C$_{18}$H$_{36}$—, a 1,4-trans-cyclohexylene group, —C$_2$H$_4$—OCO—C$_2$H$_4$—, —C$_2$H$_4$—OCO—, —C$_2$H$_4$—O—C$_5$H$_{10}$—, —CH$_2$—O—C$_5$H$_9$(C$_5$H$_{11}$)—, —C$_2$H$_4$—CONH—C$_2$H$_4$—, —C$_4$H$_8$—OCONH—C$_6$H$_{12}$—, —CH$_2$—OCONHC$_{10}$H$_{20}$—, and —CH$_2$CH(OH)CH$_2$—.

When $R^y$ represents an arylene group having 6 to 20 carbon atoms, the number of carbon atoms in the arylene group is preferably 6 to 18, more preferably 6 to 14, and particularly preferably 6 to 10. Specific examples of the arylene group represented by $R^y$ include a phenylene group, a biphenylene group, —C$_6$H$_4$—CO—C$_6$H$_4$—, and a naphthylene group.

When $R^y$ represents an aralkylene group having 7 to 20 carbon atoms, the number of carbon atoms in the aralkylene group is preferably 7 to 18, more preferably 7 to 14, and particularly preferably 7 to 10. Specific examples of the aralkylene group represented by $R^y$ include —C$_3$H$_6$—C$_6$H$_4$—, —C$_2$H$_4$—C$_6$H$_4$—, —CH$_2$—C$_6$H$_4$—C$_6$H$_4$—C$_2$H$_4$—, and —C$_2$H$_4$—OCO—C$_6$H$_4$—.

Examples of the hydrophilic group represented by A in Formula (5) include the hydrophilic groups described above and the preferable ranges are the same.

When the specific copolymer has the repeating unit represented by Formula (5), a content of the repeating unit represented by Formula (5) in the specific copolymer is as follows.

When the hydrophilic group A in Formula (5) represents an ionic hydrophilic group, a content of the repeating unit represented by Formula (5) is preferably from 5% by mass to 50% by mass, more preferably from 5% by mass to 40% by mass, and particularly preferably from 5% by mass to 20% by mass with respect to a total amount of the repeating unit (g-2) included in the specific copolymer.

When the hydrophilic group A in Formula (5) represents a nonionic hydrophilic group, a content of the repeating unit represented by Formula (5) is preferably from 20% by mass to 95% by mass, more preferably from 30% by mass to 80% by mass, and particularly preferably from 30% by mass to 70% by mass with respect to a total amount of the repeating unit (g-2) included in the specific copolymer.

The repeating unit represented by Formula (5) is derived from a monomer represented by the following Formula (5'). By incorporating the monomer as a copolymerization component, the repeating unit (g-2) is introduced in the specific copolymer.

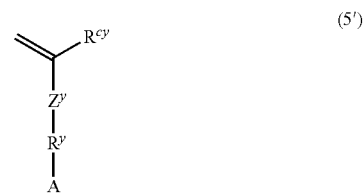

(5')

In Formula (5'), $R^{cy}$, $Z^y$, $R^y$, and A have the same meanings as $R^{cy}$, $Z^y$, $R^y$, and A in Formula (5) and preferable ranges are also the same.

Preferable examples of the monomer represented by Formula (5') include monomer compounds given below. However, the invention is not limited thereto.

Methoxy polyethylene glycol (meth)acrylate, polyethylene glycol (meth)acrylate, polypropylene glycol (meth)acrylate, poly(ethylene glycol-co-propylene glycerol) (meth)acrylate, 2-hydroxyethyl(meth)acrylate, glycerol(meth)acrylate, methacryloyloxyethyl ethylene urea, vinyl pyrrolidone, 3-(meth)acryloyloxy-γ-butyrolactone, acrylamide, tert-butylacrylamide, N,N-dimethyl(meth)acrylamide, diacetone acrylamide, sodium (meth)acrylate, potassium (meth)acrylate, tetrabutylammonium (meth)acrylate, sodium mono-(meth)acryloxyethyl succinate, mono-(meth)acryloxyethyl phthalate, sodium mono-(meth)acryloxyethyl phthalate, (meth)acryloxyethyl acid phosphate, sodium 2-acrylamide-2-methylpropane sulfonate, 2-acrylamide-2-methylpropane sulfonate, styrene sulfonic acid, sodium styrenesulfonate, and vinyl benzoate.

The monomer represented by Formula (5') may be a commercially available product or may be produced by a commonly used method.

In addition, besides the monomer represented by Formula (5'), unsaturated dicarboxylic acids such as maleic acid, maleic anhydride, fumaric acid, and anhydrides thereof, and dicarboxylates derived therefrom can also be preferably used.

A preferable content of the repeating unit having a hydrophilic group in the specific copolymer varies depending on the kind of the hydrophilic group. The content thereof is preferably a content making the specific copolymer be water-soluble.

Herein, "the specific copolymer is water-soluble" means that an amount of the specific copolymer which can be dissolved in water at 25° C. is 3% by mass or more with respect to an amount of the water.

A content of the repeating unit (g-2) in the specific copolymer is preferably from 8% by mass to 25% by mass, more preferably from 10% by mass to 23% by mass, and still more preferably from 10% by mass to 20% by mass with respect to a total amount of the specific copolymer.

When the content of the repeating unit (g-2) is within the above range, the polarity of the specific copolymer may be appropriately maintained and suitable water resistance can be obtained.

The repeating unit (g-2) included in the specific copolymer may be a single kind or two or more kinds (Repeating Unit (g-3) Having Hydrophobic Group)

The specific copolymer may include a (g-3) repeating unit having a hydrophobic group. By including the repeating unit having a hydrophobic functional group, the polarity of the specific copolymer may be appropriately maintained. Thus, an ink image formed by the ink composition may exhibit excellent water resistance and have excellent adhesion to a nonabsorbable recording medium.

The repeating unit (g-3) is not particularly limited as long as it is a repeating unit derived from a vinyl monomer and it can provide a homopolymer, the homopolymer being consisted of only the repeating unit (g-3), having a weight average molecular weight of 10,000 or more, and having a solubility in water to achieve a concentration thereof of less than 1.0% by mass with respect to an amount of water at 25° C. Particularly, a repeating unit derived from a monomer selected from the group consisting of an alkyl ester of (meth) acrylic acid and an aralkyl ester of (meth)acrylic acid is suitably used.

From the viewpoint of adjusting the polarity of the specific copolymer within an appropriate range, the hydrophobic group is preferably an alkyl group having 5 to 22 carbon atoms in total, more preferably an alkyl group having 8 to 22 carbon atoms, and still more preferably an alkyl group having 8 to 14 carbon atoms. In other words, in a case in which the monomer is an alkyl acrylate, the repeating unit (g-3) is an ester having an alkyl group having 4 to 19 carbon atoms, and is preferably an ester having an alkyl group having 4 to 13 carbon atoms. In a case of in which the monomer is an alkyl methacrylate, the repeating unit (g-3) is an ester having an alkyl group having 4 to 18 carbon atoms, and is preferably an ester having an alkyl group having 4 to 10 carbon atoms.

The alkyl group may be linear, may have a branched chain, or may be cyclic. In addition, the alkyl group may be an aralkyl ester such as a benzyl group or a phenoxy ethyl group.

Examples of the monomer from which the repeating unit (g-3) that can be included in the specific copolymer is derived are listed below. However, the invention is not limited thereto.

Examples thereof include methyl (meth)acrylate, ethyl (meth)acrylate, n-propyl (meth)acrylate, isopropyl (meth) acrylate, n-butyl (meth)acrylate, isobutyl (meth)acrylate, tert-butyl (meth)acrylate, n-hexyl (meth)acrylate, 2-ethylhexyl (meth)acrylate, octyl (meth)acrylate, decyl (meth)acrylate, dodecyl (meth)acrylate, stearyl (meth)acrylate, and cyclohexyl (meth)acrylate. Specific examples thereof include (meth)acrylic acid esters such as n-propyl methacrylate, isopropyl methacrylate, n-butyl (meth)acrylate, isobutyl (meth) acrylate, tert-butyl (meth)acrylate, n-hexyl (meth)acrylate, 2-ethylhexyl (meth)acrylate, octyl (meth)acrylate, benzyl (meth)acrylate, phenoxy ethyl (meth)acrylate, tetrahydrofurfuryl (meth)acrylate, and acetoacetoxyethyl (meth)acrylate, styrenes such as styrene, α-methylstyrene, and 4-methylstyrene, and vinyl ethers such as chloromethyl vinyl ether. Among those, preferred are alkyl group-substituted (meth) acrylic acid esters having 5 to 22 carbon atoms in total, such as n-propyl methacrylate, isopropyl methacrylate, n-butyl (meth)acrylate, isobutyl (meth)acrylate, tert-butyl (meth) acrylate, n-hexyl (meth)acrylate, 2-ethylhexyl (meth)acrylate, octyl (meth)acrylate, decyl (meth)acrylate, dodecyl (meth)acrylate, stearyl (meth)acrylate, and cyclohexyl methacrylate. More preferred are n-propyl methacrylate, isopropyl methacrylate, n-butyl (meth)acrylate, isobutyl (meth)acrylate, tert-butyl (meth)acrylate, n-hexyl (meth)acrylate, 2-ethylhexyl (meth)acrylate, octyl (meth)acrylate, benzyl (meth) acrylate, phenoxy ethyl (meth)acrylate, and the like. Particularly preferred are n-butyl (meth)acrylate, isobutyl (meth)acrylate, tert-butyl (meth)acrylate, cyclohexyl (meth) acrylate, isobornyl methacrylate, 2-ethylhexyl methacrylate, and phenoxy ethyl (meth)acrylate.

When the specific copolymer includes the repeating unit (g-3), the repeating unit (3) may be a single kind or two or more kinds The repeating unit (g-3) having a hydrophobic group included in the specific copolymer has a content of preferably from 5% by mass to 72% by mass, more preferably from 20% by mass to 65% by mass, and further preferably from 25% by mass to 60% by mass, from the viewpoint of reducing the polarity of the copolymer.

(SP Value of Specific Copolymer)

The specific copolymer has a SP value of preferably from 20.7 $MPa^{1/2}$ to 23.0 $MPa^{1/2}$, more preferably from 21.2 $MPa^{1/2}$ to 22.8 $MPa^{1/2}$, and particularly preferably from 21.5 $MPa^{1/2}$ to 22.5 $MPa^{1/2}$.

SP values of typical monomer units used in the invention are listed below. Numerical values described in the parentheses after the names of monomers indicate SP values, and the unit thereof is $MPa^{1/2}$:

Monomer 1 below (24.41), monomer 2 below (23.22), monomer 3 below (22.75), methacrylic acid (24.02), 2-hydroxyethyl methacrylate (22.89), 2-hydroxyethyl acrylamide (32.87), methyl methacrylate (19.5), n-butyl methacrylate (18.33), isobutyl methacrylate (17.76), tert-butyl methacrylate (17.97), 2-ethylhexyl methacrylate (17.30), stearyl methacrylate (17.08), 2-hydroxyethyl methacrylate (22.89), tetrahydrofurfuryl methacrylate (21.29), cyclohexyl methacrylate (18.79), benzyl methacrylate (20.21), 2-phenoxyethyl methacrylate (20.23), and isobornyl methacrylate (18.09).

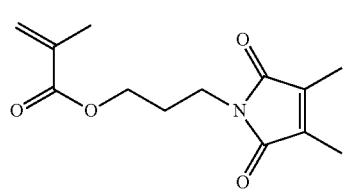

Monomer 1

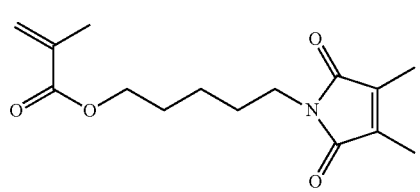

Monomer 2

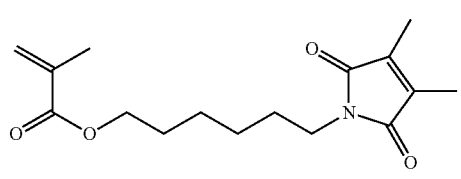

Monomer 3

Since the specific copolymer includes the repeating unit (g-1), it becomes easy to obtain both water resistance and solvent resistance via regulation of polarity. In addition, in preferable embodiments, by regulating the polarity (SP value) of the specific copolymer within the specified range, there can be obtained a white ink composition having excellent adhesion to a recording medium.

In the specific copolymer, the preferable contents of the repeating unit (g-1), the repeating unit (g-2), and the repeating unit (g-3) included if desired are as described above. The SP value is preferably selected such that contents of the respective units are within their preferable ranges, the SP value is within the above preferable range, and a total of the contents of all repeating units becomes 100% by mass.

The specific copolymer in the ink composition has a weight average molecular weight of preferably from 5,000 to 150,000 from the viewpoint of water resistance, and more preferably from 5,000 to 100,000 from the viewpoint of improving ejectability. The weight average molecular weight is measured by gel permeation chromatography (GPC). Using HLC-8020GPC (manufactured by Tosoh Corporation) as GPC apparatus, TSKgel SuperHZM-H, TSKgel SuperHZ4000, and TSKgel SuperHZ2000 (manufactured by Tosoh Corporation; 4.6 mm ID×15 cm) as columns, and THF (tetrahydrofuran) as eluent, measurement was performed at a column oven temperature of 40° C. For calculation of molecular weight, standard polystyrene was used.

Hereinbelow, specific examples of the specific copolymer that can be used in the invention will be listed by describing repeating units included in the specific copolymers, contents by mass thereof, and weight average molecular weights. However, the invention is not limited thereto. The "SP" values below indicate SP values of the copolymers and are values obtained by the measurement method described above.

In addition, copolymers represented by the following structural formulas P-1 to P-10 are also preferable specific examples of the specific copolymer. The ratio of a/b in the individual structural formulas indicates a mass ratio.

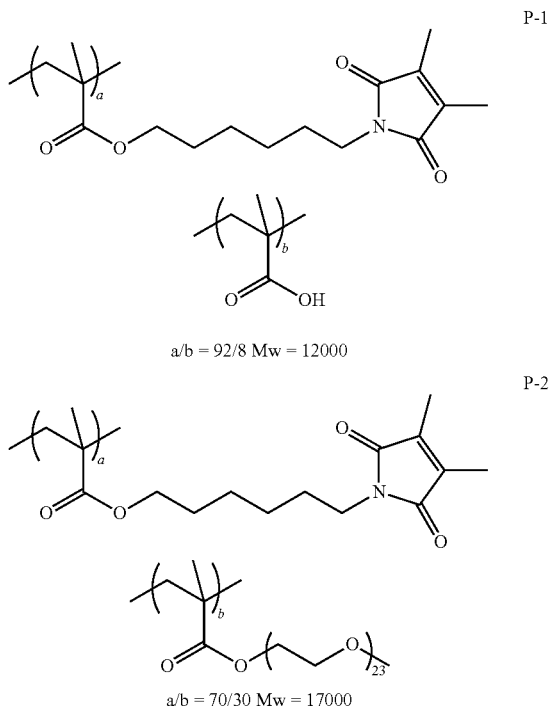

TABLE 1

| | (a-1) | | (a-2) | | | | | | (a-3) | | | | SP value |
|---|---|---|---|---|---|---|---|---|---|---|---|---|---|
| | Name | (%) | Name | (%) | Name | (%) | Name | (%) | Name | (%) | Name | (%) | Mw | (MPa$^{1/2}$) |
| A-1 | Monomer 1 | 50 | MAA | 9 | MAANa | 7 | | | BMA | 34 | | | 72300 | 22.3 |
| A-2 | Monomer 1 | 40 | MAA | 6 | MAANa | 6 | | | iBMA | 48 | | | 83500 | 21.2 |
| A-3 | Monomer 1 | 50 | MAA | 9 | MAANa | 7 | | | BMA | 24 | tBMA | 10 | 79400 | 22.2 |
| A-4 | Monomer 1 | 60 | MAA | 9 | MAA-Na | 7 | | | BMA | 24 | | | 61500 | 22.9 |
| A-5 | Monomer 1 | 40 | MAA | 9 | MAA-Na | 7 | | | tBMA | 44 | | | 45700 | 21.5 |
| A-6 | Monomer 1 | 60 | MAA | 9 | MAA-Na | 7 | | | BMA | 24 | | | 37600 | 22.2 |
| A-7 | Monomer 1 | 40 | MAA | 6 | MAA-Na | 6 | HEMA | 8 | tBMA | 40 | | | 96000 | 21.7 |
| A-8 | Monomer 1 | 40 | MAA | 6 | MAA-Na | 6 | HEAA | 8 | tBMA | 40 | | | 43000 | 22.5 |
| A-9 | Monomer 1 | 30 | MAA | 7 | MAA-Na | 7 | | | tBMA | 56 | | | 83000 | 20.8 |
| A-10 | Monomer 1 | 40 | MAA | 9 | MAA-Na | 7 | | | CyHMA | 44 | | | 70100 | 21.9 |
| A-11 | Monomer 1 | 40 | MAA | 9 | MAA-Na | 7 | | | BMA | 44 | PEMA | 24 | 72300 | 22.1 |
| A-12 | Monomer 1 | 60 | MAA | 9 | MAA-Na | 7 | | | tBMA | 24 | C18MA | 10 | 62000 | 22.1 |
| A-13 | Monomer 1 | 20 | MAA | 9 | MAA-Na | 7 | | | tBMA | 40 | PEMA | 24 | 83000 | 20.8 |
| A-14 | Monomer 1 | 70 | MAA | 6 | MAA-Na | 6 | | | tBMA | 18 | | | 73000 | 22.9 |
| A-15 | Monomer 1 | 40 | MAA | 9 | MAA-Na | 7 | | | IBOMA | 44 | | | 51900 | 21.6 |
| A-16 | Monomer 3 | 40 | MAA | 9 | MAA-Na | 7 | | | BMA | 44 | | | 46000 | 21.0 |
| A-17 | Monomer 1 | 50 | MAA | 9 | MAA-Na | 7 | | | BMA | 24 | tBMA | 10 | 53000 | 22.4 |
| A-18 | Monomer 1 | 50 | MAA | 9 | MAA-Na | 7 | | | BMA | 24 | BnMA | 10 | 71300 | 22.5 |
| A-19 | Monomer 1 | 38 | MAA | 2 | MAA-Na | 10 | | | tBMA | 50 | | | 38000 | 21.1 |
| A-20 | Monomer 1 | 50 | MAA | 6 | MAA-Na | 6 | | | tBMA | 38 | | | 11500 | 21.9 |
| A-21 | Monomer 1 | 50 | MAA | 9 | MAA-Na | 7 | | | EHMA | 14 | tBMA | 20 | 69800 | 22.1 |
| A-22 | Monomer 1 | 60 | MAA | 9 | MAA-Na | 7 | | | EHMA | 24 | | | 83800 | 22.6 |
| A-23 | Monomer 1 | 60 | MAA | 4 | MAA-Na | 8 | | | BMA | 28 | | | 61500 | 22.7 |
| A-24 | Monomer 2 | 40 | MAA | 9 | MAA-Na | 7 | | | BMA | 44 | | | 46500 | 21.2 |

-continued

P-3
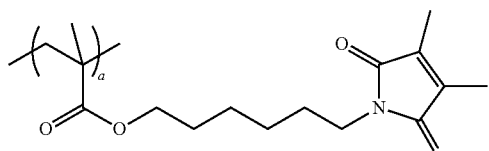
a/b = 50/50 Mw = 22000

P-4
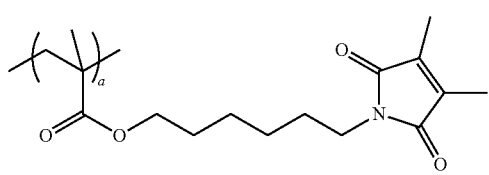
a/b = 60/40 Mw = 16000

P-5
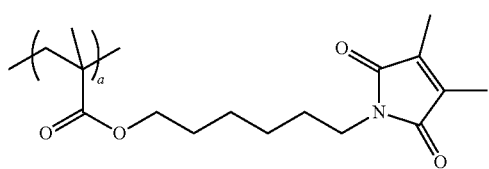
a/b = 85/15 Mw = 35000

P-6
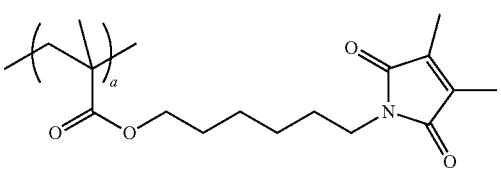
a/b = 30/70 Mw = 42000

P-7
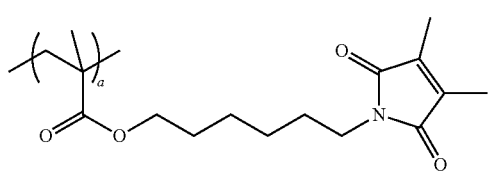

-continued

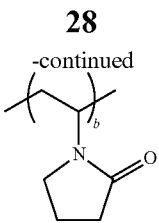
a/b = 40/60 Mw = 16000

P-8
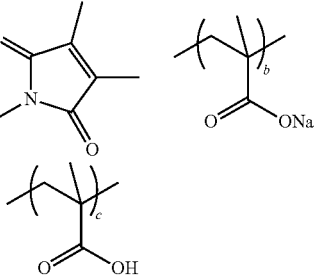
a/b/c = 85/5/10 Mw = 46000

P-9
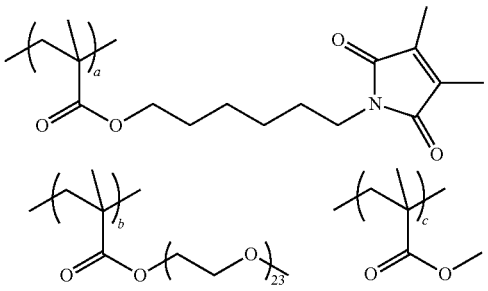
a/b/c = 30/50/20 Mw = 19000

P-10
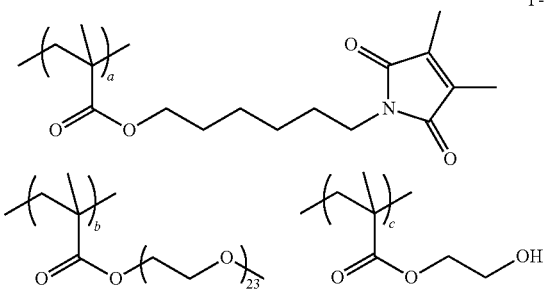
a/b/c = 60/10/30 Mw = 32000

The abbreviations in Table 1 are as follows:

MAA: methacrylic acid (manufactured by Waco Pure Chemical Industries, Ltd).

MAA-Na: sodium methacrylate (produced by neutralizing a polymer prepared by copolymerization of methacrylic acid).

BMA: n-butyl methacrylate (manufactured by Waco Pure Chemical Industries, Ltd).

iBMA: isobutyl methacrylate (manufactured by Waco Pure Chemical Industries, Ltd).

tBMA: tert-butyl methacrylate (manufactured by Waco Pure Chemical Industries, Ltd).

IBOMA: isobornyl methacrylate (manufactured by Waco Pure Chemical Industries, Ltd).

C18MA: octadecyl methacrylate (manufactured by Waco Pure Chemical Industries, Ltd).

CyHMA: cyclohexyl methacrylate (manufactured by Waco Pure Chemical Industries, Ltd).

PEMA: phenoxyethyl methacrylate (trade name: NK ESTER PHE-1G, manufactured by Shin-Nakamura Chemical Co., Ltd.).

EHMA: 2-ethylhexyl methacrylate (manufactured by Waco Pure Chemical Industries, Ltd).

BnMA: benzyl methacrylate (manufactured by Waco Pure Chemical Industries, Ltd).

The specific copolymer according to the invention can be obtained, for example, by copolymerizing a monomer for forming the repeating unit (g-1), a monomer for forming the repeating unit (g-2), and, if needed, a monomer for forming the repeating unit (g-3) by a known polymerization method and additionally, as needed, neutralizing acidic groups using alkali metal hydroxide or the like. Specifically, the specific copolymer can be produced by a method based on a polymerization method described in, for example, JP-A No. S52-988, JP-A No. S55-154970, Langmuir Vol. 18, No. 14, pp. 5414-5421 (2002), or the like.

The white ink composition according to the invention can further include (h) a water-soluble organic solvent, (i) a surfactant, and/or other additives.

[(h) Water-Soluble Organic Solvent]

The white ink composition of the invention includes water as a solvent, and may further include a water-soluble organic solvent.

Herein, the "water-soluble organic solvent" means an organic solvent having a solubility in water which enables dissolving, in water at 25° C., the organic solvent at an amount of 10% by mass or more with respect to an amount of the water.

Examples of the water-soluble organic solvent that can be used in the invention include those below:

Alcohols, such as methanol, ethanol, propanol, isopropanol, butanol, isobutanol, secondary butanol, tertiary butanol, pentanol, hexanol, cyclohexanol, and benzyl alcohol.

Polyols, such as ethylene glycol, diethylene glycol, triethylene glycol, polyethylene glycol, propylene glycol, dipropylene glycol, polypropylene glycol, butylene glycol, hexanediol, pentanediol, glycerin, hexanetriol, thiodiglycol, and 2-methylpropanediol.

Monoethers and diethers of polyol, such as ethylene glycol monomethyl ether, ethylene glycol monoethyl ether, ethylene glycol monobutyl ether, diethylene glycol monoethyl ether, diethylene glycol monomethyl ether, diethylene glycol monobutyl ether, propylene glycol monomethyl ether, propylene glycol monobutyl ether, tripropylene glycol monomethyl ether, dipropylene glycol monomethyl ether, dipropylene glycol dimethyl ether, ethylene glycol monomethyl ether acetate, triethylene glycol monomethyl ether, triethylene glycol monoethyl ether, triethylene glycol monobutyl ether, ethylene glycol monophenyl ether, and propylene glycol monophenyl ether.

Amines, such as ethanolamine, diethanolamine, triethanolamine, N-methyldiethanolamine, N-ethyldiethanolamine, morpholine, N-ethylmorpholine, ethylenediamine, diethylenediamine, triethylenetetramine, tetraethylenepentamine, polyethyleneimine, pentamethyldiethylenetriamine, and tetramethylpropylenediamine.

Amides, such as formamide, N,N-dimethylformamide, N,N-dimethylacetamide, methoxypropionamide, N-methylmethoxypropionamide, N,N-dimethylmethoxypropionamide, n-butoxypropionamide, N-methyl-n-butoxypropionamide, and N,N-dimethyl-n-butoxypropionamide.

Heterocyclic compounds, such as 2-pyrrolidone, N-methyl-2-pyrrolidone, cyclohexyl pyrrolidone, 2-oxazolidone, 1,3-dimethyl-2-imidazolidinone, γ-butyrolactone, propylene carbonate, ethylene carbonate, and ethylene urea.

Sulfoxides, such as dimethylsulfoxide.

Sulfones, such as sulfolane.

Others not included in those above, such as urea, acetonitrile, and acetone.

Examples of preferable water-soluble organic solvents include monoethers and diethers of polyol and heterocyclic compounds. Any one of those solvents may be used singly or in a combination of two or more thereof in the composition.

Preferable examples of the monoethers and diethers of polyol include the so-called glycol ethers. Specifically, for example, preferred are tripropylene glycol monomethyl ether, dipropylene glycol monomethyl ether, and dipropylene glycol dimethyl ether, and more preferred is 2-dipropylene glycol monomethyl ether.

Among the heterocyclic compounds, preferred are 2-pyrrolidone, γ-butyrolactone, propylene carbonate, ethylene urea, and the like, and particularly preferred are 2-pyrrolidone and γ-butyrolactone.

Particularly, solvents having a high boiling point can be preferably used. Preferred are solvents having a boiling point of 120° C. or higher at ordinary pressure and more preferred are those having a boiling point of 150° C. or higher at ordinary pressure.

The water-soluble organic solvent may be used singly or in a combination of plural ones. When the water-soluble organic solvent is included, a content thereof is preferably from 1% by mass to 60% by mass, and more preferably from 2% by mass to 35% by mass, with respect to a total amount of the white ink composition.

Inclusion of a volatile organic solvent may affect the curability of an image when the white ink composition is applied on a recording medium. Accordingly, if there is such a concern, it is preferable to use substantially no organic solvent. More specifically, a content of an organic solvent having a boiling point of 250° C. or lower is preferably 5% by mass or less, and more preferably 1% by mass or lower with respect to a total amount of the white ink composition. Mostly preferably, except for incidental impurities, such an organic solvent is not included.

[(i) Surfactant]

The surfactant can be added to the white ink composition.

Preferable examples of the surfactant include anionic surfactants such as dialkyl sulfosuccinates, alkyl naphthalene sulfonates, and fatty acid salts, nonionic surfactants such as polyoxyethylene alkyl ethers, polyoxyethylene alkyl allyl ethers, acetylene glycols, and polyoxyethylene-polyoxypropylene block copolymers, and cationic surfactants such as alkyl amine salts and quaternary ammonium salts. Particularly, anionic surfactants and nonionic surfactants can be preferably used.

In addition, the invention can preferably use a silicone-containing surfactant having polyalkylsiloxane or a fluorine-containing surfactant having a fluorinated alkyl group.

For use of the surfactant, a content of the surfactant is preferably from 0.1% by mass to 5% by mass, and more preferably from 0.1% by mass to 2% by mass, with respect to a total amount of the white ink composition.

(Sensitizing Dye)

In the invention, a known sensitizing dye can also be used. Use of a sensitizing dye is preferable. The sensitizing dye preferably has a solubility in distilled water to achieve a concentration thereof of s 0.5% by mass or more, more preferably 1% by mass or more, and particularly preferably 3% by mass or more with respect to an amount of distilled water at room temperature. In addition, as the sensitizing dye, a photopolymerization initiator prepared by dispersing a water-insoluble polymerization initiator can also be used.

Examples of the known sensitizing dyes include N-[2-hydroxy-3(3,4-dimethyl-9-oxo-9H-thioxanthen-2-yloxy)propyl]-N,N,N-trimethyl aluminium chloride, benzophenone, thioxanthone, an anthraquinone derivative and a 3-acylcoumarin derivative, terphenyl, styryl ketone and 3-(aroylmethylene)thiazoline camphorquinone, eosin, rhodamine, erythrosine, modified products thereof prepared by being modified for water solubility, and dispersions thereof. Additionally, a compound represented by Formula (i) described in JP-A No. 2010-24276 and a compound represented by Formula (I) described in JP-A No. H6-0107718 can also be suitably used.

In the white ink composition of the invention, in addition to the individual ingredients described above, known various additives appropriately selected can also be included in accordance with the purposes of improvements in ejection stability, compatibility to print head and ink cartridge, storage stability, image storability, and other various performances. Examples of the additive include a polymerization inhibitor, an antioxidant, a polymer compound, a matting agent, a viscosity adjuster, a surface tension adjuster, a specific resistance adjusting agent, a film-forming agent, a preservative, a fungicide, a rust inhibitor, a solid wetting agent, and silica fine particles. Specific examples thereof include oil droplet fine particles of liquid paraffin, dioctyl phthalate, tricresyl phosphate, or silicon oil, ultraviolet absorbers described in JP-A No. S57-74193, JP-A No. S57-87988, and JP-A No. S62-261476, discoloration inhibitors described in JP-A No. S57-74192, JP-A No. S57-87989 JP-A No. S60-72785, JP-A No. S61-146591, JP-A No. H1-95091, JP-A No. H3-13376, and the like, fluorescence brightening agents described in JP-A No. S59-42993, JP-A No. S59-52689, JP-A No. S62-280069, JP-A No. S61-242871, JP-A No. H4-219266, and the like, and pH adjusting agents such as sulfuric acid, phosphoric acid, citric acid, sodium hydroxide, potassium hydroxide, and potassium carbonate.

<Method for Preparing White Ink Composition>

In preparation of the white ink composition according to the invention, preferably, the specific titanium oxide is provided in a form of a dispersion solution by being dispersed in water by using a dispersant in advance.

For the dispersing, a known disperser can be used, such as a ball mill, a sand mill, an attritor, a roll mill, a jet mill, a homogenizer, a paint shaker, a kneader, an agitator, a Henschel mixer, a colloid mill, an ultrasonic homogenizer, a pearl mill, or a wet jet mill.

When performing the dispersing, preferably, the specific water-soluble resin is used as the dispersant. Further, a surfactant or a low-molecular weight dispersant may be added. In this case, an appropriate addition amount of the dispersant is from 1 part by weight to 50 parts by weight with respect to 100 parts by weight of the specific titanium oxide.

In addition, as needed, a synergist can be used as a dispersant aid.

Into the dispersion solution of the specific titanium oxide prepared in this manner, the specific clay mineral, the specific water-soluble resin, and water are added. Further, as needed, the water-soluble polymerizable compound, the polymerization initiator, the specific copolymer, the water-soluble organic solvent, and the surfactant are added thereto, and mixing and dispersing are further performed, thereby preparing the white ink composition according to the invention.

The further mixing and dispersing may be performed at a time of addition of the ingredients or after addition thereof by evenly mixing the ingredients by using a simple stirrer such as a three-one motor, a magnetic stirrer, a disper, or a homogenizer or by mixing the ingredients by using a mixer such as a line mixer. In order to make dispersed particles finer, mixing may be also performed by using a disperser such as a bead mill or a high-pressure jet mill.

The white ink composition according to the invention preferably has a surface tension of from 40 mN/m to 200 mN/m at 25° C. Surface tension is measured at 25° C. using an automatic surface tensionmeter CBVP-Z (trade name, manufactured by Kyowa Interface Science Co., Ltd.).

In addition, the white ink composition may have a viscosity of preferably from 1 mPa·S to 30 mPa·S, and more preferably from 2 mPa·S to 30 mPa·s. The viscosity of the ink composition is one that is measured at 25° C. using VISCOMETER TV-22LT (trade name, manufactured by Toki Sangyo Co., Ltd.).

[Ink Set for Multilayer Formation]

The ink set for multilayer formation according to the invention includes the white ink composition described above and at least one ink composition including a colorant having a hue other than white (hereinafter also referred to as an "additional color ink composition").

In order to form an image using such an ink set for multilayer formation, first, a white ink composition layer including a white pigment is formed on a recording medium and then, an image is formed on the surface of the white ink composition by the additional color ink composition. In this manner, for example, even when a transparent or light-colored recording medium is used, an image which is sharp and excellent in color developability can be formed thereon.

The white ink composition used here is the white ink composition according to the invention described above.

A known color ink composition can be arbitrarily used as the ink composition which includes a colorant having a hue other than white and is used in combination with the white ink composition of the invention.

The additional color ink composition usually includes a yellow ink composition, a magenta ink composition, a cyan ink composition, and a black ink composition, and may further include other ink compositions having other colors. As needed, only any one of these may be included.

In addition, the ink set for multilayer formation according to the invention may include a clear ink composition, in addition to the white ink composition and the additional color ink composition. The clear ink composition includes substantially no colorant and is a transparent ink composition.

The clear ink composition may be used as an undercoat layer of a recording medium or may be used to form an overcoat layer (a protection layer) after forming a multilayer including an white ink image and a color ink image. When using the clear ink composition, a printed matter formed by the ink set is preferably composed of three layers.

(Colorant Having Color Hue Other Than White)

A description will be given of the colorant included in the ink composition used in combination with the white ink composition of the invention.

The colorant used can be an arbitrary colorant as long as it has a hue other than white. Examples of the colorant include dyes and pigments, and from viewpoint of durabilities such as heat resistance, light resistance, and water resistance, pigments are preferable.

In use of a pigment as a colorant, the pigment can be included in the ink composition as a pigment dispersion. Use of a pigment dispersion as the colorant is preferable from the viewpoint of improving solvent resistance. As the pigment dispersion, besides a product prepared by dispersing a pigment by using a pigment dispersant, a self-dispersing pigment can be used.

(Pigment)

Examples of the pigment used as the colorant include commonly used organic pigments, inorganic pigments, and pigments produced by dying resin particles with a dye. Usually, any of commercially available pigments can be used. In addition, commercially available pigment dispersions and pigments pre-treated with surface-treatment agents or the like, such as products prepared by dispersing pigment in an insoluble resin or the like as a dispersion medium or products prepared by grafting resin on pigment surface, can be used as long as the effects of the invention are not impaired.

Examples of these pigments include those described in Seishiro Ito, "Ganryo no Jiten (Dictionary of Pigments)" (2000), W. Herbst, K. Hunger "Industrial Organic Pigments", JP-A No. 2002-12607, JP-A No. 2002-188025, JP-A No. 2003-26978, and JP-A No. 2003-342503.

Examples of organic pigments and inorganic pigments that can be used in the invention include, as yellow pigments, monoazo pigments such as C.I. Pigment Yellow (such as First Yellow G), C.I. Pigment Yellow 74, disazo pigments such as C.I. Pigment Yellow 12 (such as Disazo Yellow), C.I. Pigment Yellow 17, C.I. Pigment Yellow 97, C.I. Pigment Yellow 3, C.I. Pigment Yellow 16, C.I. Pigment Yellow 83, C.I. Pigment Yellow 155, and C.I. Pigment Yellow 219, azo lake pigments such as C.I. Pigment Yellow 100 (such as Tartrazine Yellow Lake), condensed azo pigments such as C.I. Pigment Yellow 95 (such as Condensed Azo Yellow), C.I. Pigment Yellow 93, C.I. Pigment Yellow 94, C.I. Pigment Yellow 128, and C.I. Pigment Yellow 166, acidic dye lake pigments such as C.I. Pigment Yellow 115 (such as Quinoline Yellow Lake), basic dye lake pigments such as C.I. Pigment Yellow 18 (such as Thioflavin Lake), anthraquinone pigments such as C.I. Pigment Yellow 24 (Flavanthrone Yellow), isoindoline pigments such as Isoindolinone Yellow 3RLT (Y-110), quinophthalone pigments such as C.I. Pigment Yellow 138 (Quinophthalone Yellow), isoindoline pigments such as C.I. Pigment Yellow 139 (Isoindoline Yellow), nitroso pigments such as C.I. Pigment Yellow 153 (such as Nickel Nitroso Yellow), metal complex salt azomethine pigments such as C.I. Pigment Yellow 117 (such as Cooper Azomethine Yellow), acetolone pigments such as C.I. Pigment Yellow 120 (Benzimidazolone Yellow), C.I. Yellow Pigments 151, C.I. Pigment Yellow 154, C.I. Pigment Yellow 175, C.I. Pigment Yellow 180, C.I. Pigment Yellow 181, and C.I. Pigment Yellow 194, and nickel azo pigments such as C.I. Pigment Yellow 150. Among these, C.I. Pigment Yellow 74, C.I. Pigment Yellow 120, C.I. Pigment Yellow 150, C.I. Pigment Yellow 151, C.I. Pigment Yellow 154, C.I. Pigment Yellow 155, C.I. Pigment Yellow 180, and the like are preferably used.

Examples of pigments of red or magenta color include monoazo pigments such as C.I. Pigment Red 3 (such as Toluidine Red), B-naphthol pigments such as C.I. Pigment Red 1, C.I. Pigment Red 4, and C.I. Pigment Red 6, disazo pigments such as C.I. Pigment Red 38 (such as Pyrazolone Red B), azo lake pigments such as C.I. Pigment Red 53:1 (such as Lake Red C), C.I. Pigment Red 57:1 (such as Brilliant Carmine 6B), C.I. Pigment Red 52:1, and C.I. Pigment Red 48 (such as B-oxynaphthoic acid Lake), condensed azo pigments such as C.I. Pigment Red 144 (such as Condensed Azo Red), C.I. Pigment Red 166, C.I. Pigment Red 220, C.I. Pigment Red 214, C.I. Pigment Red 221, and C.I. Pigment Red 242, acidic dye lake pigments such as C.I. Pigment Red 174 (such as Phloxine B Lake) and C.I. Pigment Red 172 (such as Erythrosine Lake), basic dye lake pigments such as C.I. Pigment Red 81 (such as Rhodamine 6G' Lake), anthraquinone pigments such as C.I. Pigment Red 177 (such as Dianthraquinonyl Red), thioindigo pigments such as C.I. Pigment Red 88 (such as Thioindigo Bordeaux), perinone pigments such as C.I. Pigment Red 194 (such as Perinone Red), perylen pigments such as C.I. Pigment Red 149 (such as Perylen Scarlet), C.I. Pigment Red 179, C.I. Pigment Red 178, C.I. Pigment Red 190, C.I. Pigment Red 224, C.I. Pigment Red 123, and C.I. Pigment Red 224, quinacridone pigments such as C.I. Pigment Violet 19 (unsubstituted quinacridone), C.I. Pigment Red 122 (such as Quinacridone Magenta) C.I. Pigment Red 262, C.I. Pigment Red 207, and C.I. Pigment Red 209, quinacridone pigments that are solid solutions of the plural quinacridone pigments mentioned above, isoindoline pigments such as C.I. Pigment Red 180 (such as Isoindolinone Red 2BLT), alizarin lake pigments such as C.I. Pigment Red 83 (such as Madder Lake), naphtholone pigments such as C.I. Pigment Red 171, C.I. Pigment Red 175, C.I. Pigment Red 176, C.I. Pigment Red 185, and C.I. Pigment Red 208, naphthol AS-lake pigments such as C.I. Pigment Red 247, naphthol AS pigments such as C.I. Pigment Red 2, C.I. Pigment Red 5, C.I. Pigment Red 21, C.I. Pigment Red 170, C.I. Pigment Red 187, C.I. Pigment Red 256, C.I. Pigment Red 268, and C.I. Pigment Red 269, and diketopyrrolopyrrole pigments such as C.I. Pigment Red 254, C.I. Pigment Red 255, C.I. Pigment Red 264, and C.I. Pigment Red 27. Among them, preferred are quinacridone pigments such as C.I. Pigment Violet 19 (unsubstituted quinacridone), C.I. Pigment Red 122 (such as Quinacridone Magenta), C.I. Pigment Red 262, C.I. Pigment Red 207, and C.I. Pigment Red 209, quinacridone pigments as solid solutions including the above plural quinacridone pigments, and the like.

Examples of pigments of blue or cyan color include disazo pigments such as C.I. Pigment Blue 25 (such as Dianisidine Blue), phthalocyanine pigments such as C.I. Pigment Blue 15, C.I. Pigment Blue 15:1, C.I. Pigment Blue 15:2, C.I. Pigment Blue 15:3, C.I. Pigment Blue 15:4, C.I. Pigment Blue 15:6, and C.I. Pigment Blue 16 (Phthalocyanine Blue), acidic dye lake pigments such as C.I. Pigment Blue 24 (such as Peacock Blue Lake), basic dye lake pigments such as C.I. Pigment Blue 1 (such as Victoria Pure Blue BO Lake), anthraquinone pigments such as C.I. Pigment Blue 60 (such as Indanthrone Blue), and alkali blue pigments such as C.I. Pigment Blue 18 (Alkali Blue V-5:1). Among them, preferred are copper phthalocyanine pigments such as C.I. Pigment Blue 15, C.I. Pigment Blue 15:1, C.I. Pigment Blue 15:2, C.I. Pigment Blue 15:3, C.I. Pigment Blue 15:4, and C.I. Pigment Blue 15:6.

Examples of pigments of green color include phthalocyanine pigments such as C.I. Pigment Green 7 (Phthalocyanine Green) and C.I. Pigment Green 36 (Phthalocyanine Green) and azo metal complex pigments such as C.I. Pigment Green 8 (Nitroso Green) and C.I. Pigment Green 10.

Examples of pigments of orange color include isoindoline pigments such as C.I. Pigment Orange 66 (Isoindoline Orange), anthraquinone pigments such as C.I. Pigment Orange 51 (dichloropyranthrone Orange), B-naphthol pigments such as C.I. Pigment Orange 2, C.I. Pigment Orange 3, and C.I. Pigment Orange 5, naphthol AS pigments such as C.I. Pigment Orange 4, C.I. Pigment Orange 22, C.I. Pigment Orange 24, C.I. Pigment Orange 38, and C.I. Pigment Orange 74, isoindolinone pigments such as C.I. Pigment Orange 61, perinone pigments such as C.I. Pigment Orange 43, disazo pigments such as C.I. Pigment Orange 15 and C.I. Pigment Orange 16, quinacridone pigments such as C.I. Pigment Orange 48 and C.I. Pigment Orange 49, acetolone pigments such as C.I. Pigment Orange 36, C.I. Pigment Orange 62, C.I. Pigment Orange 60, C.I. Pigment Orange 64, and C.I. Pigment Orange 72, and pyrazolone pigments such as C.I. Pigment Orange 13 and C.I. Pigment Orange 34.

Examples of pigments of brown color include naphtholone pigments such as C.I. Pigment Brown 25 and C.I. Pigment Brown 32.

Examples of pigments of black color include indazine pigments such as carbon black, titanium black, and C.I. Pigment Black 1 (Aniline Black) and perylene pigments such as C.I. Pigment Black 31 and C.I. Pigment Black 32. Among them, carbon black is preferable.

Regarding herein-used pigments having a hue other than white, as the average particle size is smaller, the color developability thereof is more excellent. Accordingly, in use for a pigment dispersion, an average particle diameter of the pigment included in the pigment dispersion is preferably from 0.01 µm to 0.4 µm, and more preferably from 0.02 µm to 0.3 µm.

In addition, the largest particle diameter of the pigment may be preferably 3 µm or less, and more preferably 1 µm or less. The particle diameter of the pigment can be adjusted in accordance with selection of pigment, dispersant, and dispersion medium, setting of dispersion conditions and/or filtration conditions, and the like.

(Dispersant)

When a pigment is used as a colorant, a pigment dispersant may be used for preparing pigment particles as needed. Examples of the pigment dispersant that can be used include: active agents such as higher fatty acid salts, alkyl sulfate salts, alkyl ester sulfate salts, alkylsulfonate salts, sulfosuccinate salts naphthalenesulfonate salts, alkyl phosphate salts, polyoxyalkylene alkyl ether phosphate salts, polyoxyalkylene alkylphenyl ethers, polyoxyalkylene polyoxypropylene glycol, glycerin esters, sorbitan esters, polyoxyethylene fatty acid amides, and amine oxide; a block copolymer or a random copolymer consisting of two or more monomers selected from the group consisting of styrene, a styrene derivative, a vinylnaphthalene derivative, acrylic acid, an acrylic acid derivative, maleic acid, a maleic acid derivative, itaconic acid, an itaconic acid derivative, fumaric acid, and a fumaric acid derivative; and salts of the block copolymer or the random copolymer.

In addition, the ink composition of the invention can include a self-dispersing pigment. The "self-dispersing pigment" used herein means a pigment capable of being dispersed without any dispersant. Particularly preferred is a pigment particle having a polar group on the particle surface.

The pigment particle having a polar group on the pigment particle surface in the invention means a pigment particle having a surface which is directly modified with a polar group, or an organic substance having an organic pigment mother nucleus to which a polar group is bonded to the pigment particle surface directly or via a joint (hereinafter referred to as a "pigment derivative").

Examples of the polar group include a sulfonic acid group, a carboxylic acid group, a phosphoric acid group, a boric acid group, and a hydroxyl group. Preferred are a sulfonic acid group and a carboxylic acid group, and more preferred is a sulfonic acid group.

Examples of a method for obtaining such pigment particles having a polar group include methods described in WO 97/48769, JP-A No. H10-110129, JP-A No. H11-246807, JP-A No. H11-57458, JP-A No. H11-189739, JP-A No. H11-323232, JP-A No. 2000-265094, and the like, in which the surface of pigment particles is oxidized with an appropriate oxidant to introduce a polar group such as a sulfonic acid group or a salt thereof into at least a part of the pigment surface. Specifically, the pigment particles can be prepared by oxidizing carbon black with concentrated nitric acid, or if it is a color pigment, by oxidization with sulfamic acid, sulfonated pyridine salt, amidosulfuric acid, or the like in sulfolane or N-methyl-2-pyrrolidone. Resultants which are made to be water-soluble due to excessively advanced oxidation in these reactions are removed, thereby a purified pigment dispersion may be obtained. When a sulfonic acid group is introduced into the surface by oxidation, the acidic group may be neutralized using a basic compound as needed.

Examples of other methods for obtaining pigment particles having a polar group on the surface thereof include a method in which a pigment derivative is adsorbed onto a pigment particle surface by milling or other treatment, as described in JP-A No. H11-49974, JP-A No. 2000-273383, JP-A No. 2000-303014, or the like, and a method in which crystallization in poor solvent is performed after dissolving a pigment and a pigment derivative in a solvent as described in Japanese Patent Application No. 2000-377068, No. 2001-1495, and No. 2001-234966. Any of the methods can provide pigment particles having a polar group on the surface thereof.

The polar group on the pigment surface may be in a free state, in a salt state, or have a counter salt. Examples of the counter salt include inorganic salts (such as lithium, sodium, potassium, magnesium, calcium, aluminium, nickel, and ammonium) and organic salts (such as triethyl ammonium, diethyl ammonium, pyridinium, triethanol ammonium, and the like). Preferred are monovalent counter salts.

In the ink set for multilayer formation according to the invention, a content of the colorant (a colorant having a hue other than white) with respect to a total amount of the additional ink composition is preferably from 0.5% by mass to 10% by mass, and more preferably from 0.5% by mass to 5% by mass.

[Image Forming Method]

The image forming method according to the invention includes: applying the white ink composition to a recording medium; and irradiating the white ink composition applied to the recording medium with an active energy ray. application-irradiation. By performing these steps, an image formed from the ink composition fixed on the recording medium can be obtained.

(Ink Application)

Hereinbelow, a description will be given of the ink application in the image forming method of the invention.

The ink application in the invention is not limited as long as it is a step of applying the white ink composition of the invention on a recording medium.

As an embodiment of applying the white ink composition of the invention on a recording medium, an embodiment of applying the white ink composition on a recording medium by an inkjet method is particularly preferable.

In the image forming method of the invention, an inkjet recording apparatus used when the inkjet method is used in the ink application is not particularly limited. A known inkjet recording apparatus capable of achieving an intended resolution can be arbitrarily selected and used. In other words, any of known inkjet recording apparatuses, including commercially available ones, can be used to perform ejection of the ink composition onto a recording medium in the image forming method of the invention. Examples of the inkjet recording apparatuses include thermal jet system inkjet, piezo system inkjet, successive inkjet, roller application, and spray application.

Examples of the inkjet recording apparatus include apparatuses including an ink supplying system, a temperature sensor, and heating means.

Examples of the ink supplying system include a source tank including the ink composition of the invention, a supply pipe, an ink supplying tank arranged immediately before an inkjet head, a filter, and a piezo type inkjet head. The piezo type inkjet head can be driven such that the head can eject multi-size dots of preferably from 1 pl to 100 pl, and more preferably from 2 pl to 30 pl at a resolution of preferably from 320×320 dpi to 4,000××4,000 dpi (dot per inch), more preferably from 400×400 dpi to 1,600×1,600 dpi. The term "dpi" used in the invention represents the number of dots per 2.54 cm (1 inch).

In the ink application, the ink composition ejected is preferably maintained at a constant temperature. Accordingly, the inkjet recording apparatus preferably includes means for stabilizing the temperature of the ink composition. Portions to be maintained at constant temperature include all of the piping system and members in a range of from ink tank (an intermediate tank if arranged) to a nozzle ejection surface. In other words, portions from the ink supplying tank to the inkjet head can be insulated and heated.

The method for controlling temperature is not particularly limited. For example, preferably, plural temperature sensors are arranged on individual piping portions to perform heat control in accordance with the flow rate of the ink composition and environmental temperature. The temperature sensors can be provided near the ink supplying tank and the inkjet head nozzles. In addition, preferably, heated head unit is thermally shielded or insulated so that a main body of the apparatus is not affected by temperature of the outside air. In order to shorten a printer starting time required for heating, or in order to reduce thermal energy loss, it is preferable to insulate the heating unit from the other portions and make the thermal capacity of the entire heating unit small.

The temperature of the ink composition when ejected is preferably maintained constant. It is appropriate that the range for the temperature of the ink composition is preferably regulated to be within a range of from a temperature which is lower than of a preset temperature by 5° C. to a temperature which is higher than of a preset temperature by 5° C., still more preferably regulated to be within a range of from a temperature which is lower than of a preset temperature by 2° C. to a temperature which is higher than of a preset temperature by 2° C., and further preferably regulated to be within a range of from a temperature which is lower than of a preset temperature by 1° C. to a temperature which is higher than of a preset temperature by 1° C.

In the invention, the recording medium is not particularly limited, and a recording medium known as a support or a recording material can be used. Examples of the recording medium include paper, paper laminated with plastic (for example, polyethylene, polypropylene, polystyrene, or the like), a metal plate (for example, a plate of aluminium, zinc, copper, or the like), a plastic film (for example, a film of polyvinyl chloride resin, cellulose diacetate, cellulose triacetate, cellulose propionate, cellulose butyrate, cellulose acetate butyrate, cellulose nitrate, polyethylene terephthalate, polyethylene, polystyrene, polypropylene, polycarbonate, polyvinyl acetal, or the like), and paper or a plastic film laminated or deposited with any of the metals mentioned above.

Particularly, since the ink composition of the invention has excellent adhesion property, it can be suitably used for a nonabsorbent recording medium. Preferred are base materials made of plastic such as polyvinyl chloride, polyethylene terephthalate, or polyethylene, more preferred are base materials of polyvinyl chloride resin, and still more preferred are sheets or films of polyvinyl chloride resin.

(Irradiation)

Hereinbelow, a description will be given of the irradiation in the image forming method of the invention.

The irradiation in the invention is not limited as long as it is a step of irradiating the ink composition applied on the recording medium with an active energy ray.

Examples of the active energy ray that can be used in the irradiation include ultraviolet light (hereinafter also referred to as UV light), visible ray, infrared ray, and electron beam. UV light is preferably used.

A peak wavelength of UV light varies with the absorption properties of a sensitizing dye which can be used as needed. For example, the peak wavelength thereof is preferably from 200 nm to 600 nm, more preferably from 220 nm to 450 nm, and still more preferably from 220 nm to 420 nm. When a sensitizing dye or a photopolymerization initiator is used in the invention, the peak wavelength thereof may be preferably from 200 nm to 420 nm.

It is appropriate that UV light is applied on a surface to be exposed at a light intensity of, for example, from 10 mW/cm$^2$ to 5,000 mW/cm$^2$, and preferably from 20 mW/cm$^2$ to 3,000 mW/cm$^2$.

A mercury lamp, a gas laser or a solid laser, and the like are currently mainly used as UV light sources, and a mercury lamp, a metal halide lamp, and a UV fluorescent lamp are widely known. In addition, replacement thereof by GaN-based semiconductor UV light emitting device is industrially and environmentally very useful. LED (UV-LED) and LD (UV-LD), which are compact, have long life span, are highly efficient, and need smaller costs, are expected as UV light sources. When a sensitizing dye or a photopolymerization initiator is used in the invention, a metal halide lamp, a high pressure mercury lamp, a medium pressure mercury lamp, a low pressure mercury lamp, or a UV-LED is preferable. When a sensitizing dye or a photopolymerization initiator is not used, a medium pressure mercury lamp or a low pressure mercury lamp is preferable, and a low pressure mercury lamp is particularly preferable.

In the irradiation, it is appropriate that the ink composition of the invention applied on the recording medium is irradiated with such a UV light, for example, for 0.01 seconds to 120 seconds, and preferably for 0.1 seconds to 90 seconds.

Regarding irradiation conditions and a basic irradiation method, irradiation conditions and irradiation method disclosed in JP-A No. S60-132767 can also be similarly used in the invention. Specifically, preferred are a method in which a light source is provided on both sides of a head unit including an ink ejection device and the head unit and the light source are moved while scanning by the so-called shuttle system, or a method of performing irradiation using another light source which is not driven. Irradiation of the active energy ray may be performed after a passage of a certain length of time (for example, from 0.01 seconds to 120 seconds, and preferably from 0.01 seconds to 60 seconds) from the landing of ink, heating, and drying.

(Ink Drying)

Preferably, the image forming method of the invention further includes drying the ink after the ink application and before the irradiation (hereinafter also referred to as "heat-drying").

In the heat-drying, preferably, the ink composition ejected on the recording medium is fixed by evaporation of the water and the water-soluble organic solvent, which is used in combination as needed, by heating means.

A description will be given of the heating to dry the ejected ink composition of the invention for fixing (the heat-drying-).

The heating means is not limited as long as it can dry the water and the water-soluble organic solvent used as needed. Examples of the heating means that can be used include a heat drum, hot air, an infrared lamp, a heat oven, and heat-plate heating.

The heating temperature is preferably 40° C. or higher, more preferably from 40° C. to 150° C., and still more preferably from 40° C. to 80° C. The heating and drying time is appropriately determined in consideration of the formulation of the ink composition used and printing speed.

The ink composition fixed by heating is, as needed, irradiated with the active energy ray to be further photofixed in the irradiation. As described above, in the irradiation, fixing with UV light is preferable.

Next, a description will be given of an image forming method by the ink set for multilayer formation.

The method for forming a multilayered image using the ink set of the invention includes: forming an image by ejecting the additional color ink composition by an inkjet recording method; and providing a white ink layer by applying the white ink composition. In embodiments, the white ink composition layer may be firstly formed on a recording medium and then the additional color ink composition may be applied. The white ink composition may be applied by ejection from nozzles using the inkjet recording method or may be applied by coating. The applying method of the white ink composition is not particularly limited.

An apparatus used for the coating is not particularly limited and can be appropriately selected from known coating apparatuses in accordance with the purpose. Examples of the coating apparatuses include an air doctor coater, a blade coater, a rod coater, a knife coater, a squeeze coater, an impregnating coater, a reverse-roll coater, a transfer roll coater, a gravure coater, a kiss-roll coater, a cast coater, a spray coater, a curtain coater, and an extrusion coater.

An order of the additional color ink composition application and the white ink composition layer providing can be appropriately selected depending on a desired image.

Specifically, in the case of using a transparent recording medium and a printed matter on which an image is viewed from the recording medium side is desired, the application of the additional color ink composition onto the recording medium and the providing of the white ink layer onto the applied additional color ink composition can be performed in this order. Conversely, in the case of using a transparent recording medium and a printed matter on which an image is viewed from the ink image side is desired, it is preferable that the white ink composition layer is firstly provided onto the recording medium and then the additional color ink composition is applied onto the white ink composition layer. In this case, it is also preferable to form, on an image formed by the additional color ink composition, a protection layer after formation of the image.

In the invention, an inkjet recording method particularly preferably used is an inkjet recording method that includes: a scanning step of reciprocating, in a first direction with respect to a recording medium, an inkjet head having plural nozzle arrays including a first nozzle array where plural nozzles for ejecting the additional color ink composition are arranged and a second nozzle array where plural nozzles for ejecting the white ink composition are arranged; a relative movement step of moving the recording medium relatively with respect to the inkjet head in a second direction not parallel to the first direction; an ejection control step of dividing the nozzle arrays (the first nozzle array and the second nozzle array) into plural regions in the second direction to control the ejection of ink from the inkjet head in the respective divided nozzle regions; and an active light ray irradiation step of irradiating, with an active light ray, the ink ejected from the inkjet head and attached on the recording medium by the ejection control step, in which the active light ray irradiation step is a step of dividing an irradiation area of the active light ray into plural regions in accordance with the respective divided nozzle regions and controlling light intensity of the divided irradiation regions in the respective regions to perform the irradiation of the active light ray.

[Printed Matter]

A printed matter according to the invention has an image formed from the white ink composition of the invention or an image formed by the image forming method of the invention. The printed matter of the invention has an image excellent in blocking resistance and concealability thereon. Particularly, the printed matter having a layered image formed from the ink set including the white ink composition and the ink composition including a colorant of a hue other than white may have no image blurring. Accordingly, even when a transparent recording medium is used, a sharp image having sufficient concealability is formed, so that the advantageous effects of the invention can be remarkable.

The invention can provide a white ink composition for inkjet recording excellent in re-dispersibility and nozzle maintainability, as well as excellent in concealability, an ink set for multilayer formation including the white ink composition and a color ink composition including a colorant of a hue other than white, an image forming method using the white ink composition, and a printed matter having an image formed by the image forming method.

EXAMPLES

Hereinafter, the invention will be described in detail with reference to Examples. However, the invention is not limited to these Examples. In addition, "parts" and "%" in the following description are based on mass, unless otherwise specified.

Example 1

A mixture of 24 parts of titanium dioxide (trade name: TIPAQUE R-630, manufactured by Ishihara Sangyo K.K, a primary particle diameter: 0.24 μm), 6.6 parts of DISPER-BYK-190 (trade name, manufactured by BYK-Chemie Japan K.K, solid content concentration: 40%), and 89.4 parts of deionized water was dispersed at a rate of 1000 rpm for 4 hours by a dispersion machine READY MILL (trade name, manufactured by Imex Co. Ltd) using zirconia beads with a diameter of 0.5 mm to obtain a solution containing the dispersed titanium dioxide dispersion. A volume-average secondary particle size thereof was 280 nm.

With the titanium dioxide dispersion, in accordance with a formulation given in Table 1, a hydrophilic, layered clay mineral LUCENTITE SWF (trade name, manufactured by CO-OP Chemical Co., Ltd.), OLFINE E1010 (trade name, manufactured by Nissin Chemical Industry Co., Ltd.) as a surfactant, glycerin as a water-soluble organic solvent, and deionized water were mixed together and stirred for 20 minutes by a magnetic stirrer and the resulting solution was filtered by a filter manufactured by Millipore Co., Ltd. (a PVDF membrane with a pore diameter of 5 μm) to obtain a white ink composition 1. The term "the rest" of "deionized water" in Table 1 means an amount added such that a total amount of the white ink composition totaled 100 parts.

Example 2

A titanium dioxide dispersion was prepared in the same manner as Example 1 except that the titanium dioxide TIPAQUE R-630 (described above) was replaced by titanium oxide TIPAQUE R-680 (trade name, manufactured by Ishihara Sangyo K.K, a primary particle diameter: 0.21 μm) in the preparation of the titanium dioxide dispersion in Example 1. Then, using the titanium dioxide dispersion, a white ink composition 2 was prepared in the similar manner as Example 1 to have a formulation given in Table 1.

Example 3

A titanium dioxide dispersion was prepared in the same manner as Example 1 except that the titanium dioxide TIPAQUE R-630 (described above) was replaced by titanium oxide TIPAQUE CR-60 (trade name, manufactured by Ishihara Sangyo K.K, a primary particle diameter: 0.28 μm) in the preparation of the titanium dioxide dispersion in Example 1. Then, using the titanium dioxide dispersion, a white ink composition 3 was prepared in the similar manner as Example 1 to have a formulation given in Table 1.

Comparative Example 1

A white ink composition 4 was prepared in the same manner as Example 1 except that the formulation was modified to become that given in Table 1.

Example 4

A titanium dioxide dispersion was prepared in the same manner as Example 1 except that the titanium dioxide TIPAQUE R-630 (described above) was replaced by titanium oxide TIPAQUE CR-90 (trade name, manufactured by Ishihara Sangyo K.K, a primary particle diameter: 0.25 μm) in the preparation of the titanium dioxide dispersion in Example 1. Then, using the titanium dioxide dispersion, a white ink composition 5 was prepared in the similar manner as Example 1 to have a formulation given in Table 1.

Example 5

A titanium dioxide dispersion was prepared in the same manner as Example 1 except that the titanium dioxide TIPAQUE R-630 (described above) was replaced by titanium oxide TIPAQUE CR-50-2 (trade name, manufactured by Ishihara Sangyo K.K, a primary particle diameter: 0.25 μm) in the preparation of the titanium dioxide dispersion in Example 1. Then, using the titanium dioxide dispersion, a white ink composition 6 was prepared in the similar manner as Example 1 to have a formulation given in Table 1.

Example 6

A titanium dioxide dispersion was prepared in the same manner as Example 1 except that the titanium dioxide TIPAQUE R-630 (described above) was replaced by titanium oxide TIPAQUE CR-SUPER 70 (trade name, manufactured by Ishihara Sangyo K.K, a primary particle diameter: 0.25 μm) in the preparation of the titanium dioxide dispersion in Example 1. Then, using the titanium dioxide dispersion, a white ink composition 6 was prepared in the similar manner as Example 1 to have a formulation given in Table 1.

Examples 7 and 8

White ink compositions 8 and 9 were prepared in the same manner as Example 1, except that the kind and amount of the hydrophilic, layered clay mineral to be used in Example 1 were changed to those indicated in Table 1.

Comparative Example 2 and Example 9

A titanium dioxide dispersion was prepared in the same manner as Example 1 except that DISPERBYK-2015 (trade name, manufactured by BYK-Chemie Japan K.K) was used instead of DISPERBYK-190 (described above) in the preparation of the titanium dioxide dispersion in Example 1. Then, using the titanium dioxide dispersion, white ink compositions 10 and 11 were prepared in accordance with formulations given in Table 1.

Comparative Example 3

A titanium dioxide dispersion was prepared in the same manner as Example except for omitting a dispersant. In preparation of the dispersion, no water-soluble resin was used. Accordingly, the dispersion had poor dispersibility and particle sedimentation was observed, resulting in failure to prepare a white ink composition.

Example 10

A titanium dioxide dispersion was prepared in the same manner as Example 1 except that 5.1 parts of DISPERBYK-183 (trade name, manufactured by BYK-Chemie Japan K.K) was used instead of DISPERBYK-190 (described above) and the amount of deionized water was adjusted to obtain the same titanium dioxide concentration in the preparation of the titanium dioxide dispersion in Example 1. Then, using the titanium dioxide dispersion, a white ink composition 13 was prepared in the similar manner as Example 1 to have a formulation given in Table 1.

Example 11

A titanium dioxide dispersion was prepared in the same manner as Example 1 except that 1.2 parts of BYK-154 (trade name, manufactured by BYK-Chemie Co. Ltd.) was used instead of DISPERBYK-190 (described above) and the amount of deionized water was adjusted to obtain the same titanium dioxide concentration in the preparation of the titanium dioxide dispersion in Example 1. Then, using the titanium dioxide dispersion, a white ink composition 14 was prepared in the similar manner as Example 1 to have a formulation given in Table 1.

Example 12

A titanium dioxide dispersion was prepared in the same manner as Example 1 except that 6.3 parts of BYK-154 (described above) was used instead of DISPERBYK-190 (described above) and the amount of deionized water was adjusted to obtain the same titanium dioxide concentration in the preparation of the titanium dioxide dispersion in Example 1. Then, using the titanium dioxide dispersion, a white ink composition 15 was prepared in the similar manner as Example 1 to have a formulation given in Table 1.

Example 13

A titanium dioxide dispersion was prepared in the same manner as Example 11 except that the titanium dioxide TIPAQUE R-630 (described above) was replaced by titanium oxide TIPAQUE CR-90 (described above) in the preparation of the titanium dioxide dispersion in Example 11. Then, using the titanium dioxide dispersion, a white ink composition 16 was prepared in the similar manner as Example 11 to have a formulation given in Table 1.

Comparative Example 4

A titanium dioxide dispersion was prepared in the same manner as Example 1 except that the titanium dioxide TIPAQUE R-630 (described above) was replaced by titanium oxide TIPAQUE A-220 (trade name, manufactured by Ishihara Sangyo K.K, a primary particle diameter: 0.16 μm) in the preparation of the titanium dioxide dispersion in Example 1. Then, using the titanium dioxide dispersion, a white ink composition 17 was prepared in the similar manner as Example 1 to have a formulation given in Table 1.

Examples 14 to 17

White ink compositions 18 to 21 were respectively prepared in the same manner as Example 1 except that the amount of LUCENTITE SWF (described above) was changed to have formulations given in Table 1.

Example 18

A titanium dioxide dispersion was prepared in the same manner as Example 1 except that the amount of DISPER-BYK-190 (described above) was changed to 0.6 parts and the amount of deionized water was adjusted to obtain the same titanium dioxide concentration in the preparation of the titanium dioxide dispersion in Example 1. Then, using the titanium dioxide dispersion, a white ink composition 22 was prepared in the similar manner as Example 1 to have a formulation given in Table 1.

Example 19

A titanium dioxide dispersion was prepared in the same manner as Example 1 except that the amount of DISPER-BYK-190 (described above) was changed to 1.8 parts and the amount of deionized water was adjusted to obtain the same titanium dioxide concentration in the preparation of the titanium dioxide dispersion in Example 1. Then, using the titanium dioxide dispersion, a white ink composition 23 was prepared in the similar manner as Example 1 to have a formulation given in Table 1.

Example 20

A titanium dioxide dispersion was prepared in the same manner as Example 1 except that the amount of DISPER-BYK-190 (described above) was changed to 3.6 parts and the amount of deionized water was adjusted to obtain the same titanium dioxide concentration in the preparation of the titanium dioxide dispersion in Example 1. Then, using the titanium dioxide dispersion, a white ink composition 24 was prepared in the similar manner as Example 1 to have a formulation given in Table 1.

Example 21

A titanium dioxide dispersion was prepared in the same manner as Example 1 except that the amount of DISPER-BYK-190 (described above) was changed to 9 parts and the amount of deionized water was adjusted to obtain the same titanium dioxide concentration in the preparation of the titanium dioxide dispersion in Example 1. Then, using the titanium dioxide dispersion, a white ink composition 25 was prepared in the similar manner as Example 1 to have a formulation given in Table 1.

Example 22

A titanium dioxide dispersion was prepared in the same manner as Example 1 except that the amount of DISPER-BYK-190 (described above) was changed to 12 parts and the amount of deionized water was adjusted to obtain the same titanium dioxide concentration in the preparation of the titanium dioxide dispersion in Example 1. Then, using the titanium dioxide dispersion, a white ink composition 26 was prepared in the similar manner as Example 1 to have a formulation given in Table 1.

Example 23

Using the titanium dioxide dispersion prepared in Example 1, the following formulation was mixed together and the obtained solution was filtered by using a filter manufactured by Millipore Co., Ltd. (a PVDF membrane with a pore diameter of 5 μm) to obtain a white ink composition 27. A tetrafunctional acryl amide 1 was synthesized as follows.

Formulation of White Ink Composition
  Titanium dioxide dispersion (concentration of titanium dioxide: 20% by mass) 50.0%
  Hydroxyethyl acrylamide 1 (monofunctional acrylamide) 15.0%
  Tetrafunctional acrylamide (the exemplary polymerizable compound a) 10.0%
  SANNIX GP-250 (trade name, manufactured by Sanyo Chemical Industries, Ltd., an water-soluble organic solvent) 2.0%
  OLFINE E1010 (trade name, manufactured by Nissin Chemical Industry Co., Ltd., a surfactant) 1.0%
  IRGACURE 2959 (trade name, manufactured by BASF Co., Ltd., a photopolymerization initiator) 3.0%
  Deionized Water the remainder (so that the total amount becomes 100.0%)

[Synthesis of Tetrafunctional Acrylamide 1]

As a (meth)acrylamide compound represented by Formula (3) (the specific (meth)acrylamide compound), the tetrafunctional acrylamide 1 was synthesized as below.

First Step 121 g (1 equivalent) of tris(hydroxymethyl) aminomethane (Tokyo Chemical Industry Co., Ltd.), 84 ml of 50% by mass potassium hydroxide aqueous solution, and 423 ml of toluene were placed in a one liter three-necked flask equipped with a stir bar. The obtained mixture was stirred, and while maintaining the reaction system of a temperature of from 20° C. to 25° C. in a water bath, 397.5 g (7.5 equivalents) of acrylonitrile was added dropwise over 2 hours. After the dropping, stirring was performed for 1.5 hours. Then, 540 ml of toluene was added to the reaction system and the reaction mixture was transferred to a separating funnel to remove a water layer. The remaining organic layer was dried with magnesium sulfate and then filtered with celite, and the solvent was distilled away under reduced pressure to obtain an acrylonitrile adduct. The results of the obtained substance analyzed by $^1$H-NMR and MS showed good matching with a known substance. Thus, without further purification, the substance was used for the subsequent reduction reaction.

Second Step 24 g of the obtained acrylonitrile adduct, 48 g of Ni catalyst (trade name: RANEY NICKEL 2400, manufactured by W. R. Grace & Co), and 600 ml of 25% by mass ammonium aqueous solution (water:methanol=1:1) were placed in a one liter autoclave. The mixture was stirred into suspension and the reactor vessel was tightly closed. Then, 10 Mpa of hydrogen was introduced in the reactor vessel to react the mixture with hydrogen at a reaction temperature of 25° C. for 16 hours.

After confirming the disappearance of the raw material by $^1$H-NMR, the reaction mixture was filtered with celite, and the celite was washed with methanol a couple of times. The solvent was distilled away from the filtrate under reduced pressure to obtain a polyamine body. The obtained substance was used in the subsequent reaction, without further purification.

Third Step 30 g of the obtained polyamine body, 120 g (14 equivalents) of NaHCO$_3$, 1 L of dichloromethane, and 50 ml of water were placed in a 2 liter three-necked flask equipped with a stirrer. In an ice bath, 92.8 g (10 equivalents) was added dropwise in 3 hours. After that, the mixed solution was stirred at room temperature for 3 hours. After confirming the disappearance of the raw material, the solvent was distilled away from the reaction mixture under reduced pressure. Next, the reaction mixture was dried with magnesium sulfate and then filtered with celite, and the solvent was distilled away under reduced pressure. Finally, purification by column chromatography (ethyl acetate/methanol=4/1) was performed to obtain a solid of the tetrafunctional acrylamide 1 (in Formula (3), $R^1$ represents H, $R^2$ represents $C_3H_6$, $R^3$ represents $CH_2$, and X, Y, and Z, respectively, represent 0) at room temperature.

The yield of the tetrafunctional acrylamide 1 obtained through the step 3 was 40% by mass.

Example 24

A white ink composition 28 was obtained in the same manner as Example 23 except that the titanium dioxide dispersion to be used was replaced by the titanium dioxide dispersion prepared in Example 4 to prepare the ink having a formulation given in Table 5.

Example 25

A white ink composition 29 was obtained in the same manner as Example 23 except that the titanium dioxide dispersion to be used was replaced by the titanium dioxide dispersion prepared in Example 5 to prepare the ink having a formulation given in Table 5.

Example 26

A white ink composition 30 was obtained in the same manner as Example 23 except that the titanium dioxide dispersion to be used was replaced by the titanium dioxide dispersion prepared in Example 6 to prepare the ink having a formulation given in Table 5.

Example 27 and Comparative Example 5

A mixture was obtained by adding a specific copolymer A-1 (see Table 1 above), a surfactant FS-34 (trade name, manufactured by DuPont Co., Ltd., 24%), LUCENTITE SWF (trade name, manufactured by CO—OP Chemical Co., Ltd.), and water to the titanium dioxide dispersion prepared in Example 1. The mixture was stirred for 20 minutes by a three-one motor to obtain a white ink composition 31.

On the other hand, a mixture was obtained by adding a specific copolymer A-1 (see Table 1 above), a surfactant FS-34 (described above), and water to the titanium dioxide dispersion prepared in Example 1. The mixture was stirred for 20 minutes by a three-one motor to obtain a white ink composition 32.

The white ink compositions prepared as described above were respectively evaluated as follows and the results were listed in Tables 2 to 6.

<Re-Dispersibility>

The white ink compositions of Examples 1 to 26 and Comparative Examples 1 to 4 were respectively placed in an amount of 75 mL into respective 100 mL screw bottles. Then, the bottles were tightly sealed and allowed to stand for 2 weeks in an environment with a room temperature of 25° C. After that, each bottle was shaken in a width of 20 cm vertically so as to make 10 reciprocations and then, 2 mL of the ink in the screw bottle was gently collected from a position near the liquid surface of the bottle.

Deionized water was added to 1 g of the collected sample to dilute to 10000 times. Absorbance (Abs. value) of the diluted solution at a wavelength of 490 nm was measured by using a spectrophotometer. Absorbances of the samples were compared with absorbances immediately after preparation of the respective white ink compositions to calculate the recovery rate of absorbance by the following equation.

Recovery rate of absorbance(%)=100×(absorbance after allowing to stand)/(absorbance immediately after preparation)

The results obtained were classified based on the following criteria for evaluation.

AA: Recovery rate of 97% or more.
A: Recovery rate of from 95% to less than 97%.
B: Recovery rate of from 85% to less than 95%.
C: Recovery rate of from 70% to less than 85%
D: Recover rate of less than 70%.

<Maintainability>

Regarding Examples 1 to 27 and Comparative Examples 1 to 5, maintainability was evaluated as follows.

As an inkjet recording apparatus, an inkjet apparatus equipped with a 600 dpi prototype printhead with 256 nozzles was prepared for evaluation.

Each of the obtained white ink compositions was ejected for 30 minutes. After that, as maintenance work, a pressure of 15 KPa was applied for 10 seconds and wiping was performed by CLEAN WIPER FF-390c (trade name, manufactured by Kuraray Corp.). Then, additional ejection of the ink composition was continued for 5 minutes to form an image recorded on a PET base material (an OHP film for PPC/laser, trade name: GAAA5224, manufactured by Fuji Xerox Co., Ltd., a thickness: 50 μm) was visually observed. The results of the observation were classified based on the following criteria for evaluation.

A: No missing nozzle was found.
B: One or two missing nozzles were found.
C: Three or more missing nozzles were found.

Concealability

Each of Examples 1 to 27 and Comparative Examples 1 to 5 was coated on a PET base material (GAAA5224 described above) using a wire bar having a wire with a diameter of 0.54 millimeters within a period of from the completion of the preparation of the ink to 1 hour thereafter and dried at 35° C. for 8 hours to produce a solid coat sample. The sample was placed on a concealability measurement sheet having a black side and a white side (based on JIS K5400) to measure a density of black color (OD.: optical density) on the black side and the white side, respectively, using a SPECTRO-SCAN (trade name, manufactured b Gretag Macbeth, Inc.), so as to calculate concealability based on the difference of the densities.

Concealability=(Density of black color measured on white side)−(Density of black color measured on black side).

A: Concealability of less than 0.28
B: Concealability of from 0.28 to less than 0.3
C: Concealability of from 0.3 to less than 0.35
D: Concealability of from 0.35 to less than 0.4
E: Concealability of 0.4 or more In Tables 2 to 6 below, blanks mean that no corresponding component is contained. Details of the titanium dioxides, water-soluble resins, and hydrophilic, layered clay minerals, which are indicated in the Tables by product names, are summarized in Table 7.

TABLE 2

| | | \multicolumn{10}{c}{Example or Comparative Example (Comparative Example: "C" was added before number.)} | | | | | | | | | |
|---|---|---|---|---|---|---|---|---|---|---|---|
| | | 1 | 2 | 3 | C1 | 4 | 5 | 6 | 7 | 8 | C2 |
| White ink composition | | 1 | 2 | 3 | 4 | 5 | 6 | 7 | 8 | 9 | 10 |
| | Product name | | | | | | | | | | |
| Titanium dioxide | R-630 | 10 | | | 10 | | | | 10 | 10 | 10 |
| | R-680 | | 10 | | | | | | | | |
| | CR-60 | | | 10 | | | | | | | |
| | CR-90 | | | | | 10 | | | | | |
| | CR-50-2 | | | | | | 10 | | | | |
| | CR-Super70 | | | | | | | 10 | | | |
| | Product name | | | | | | | | | | |
| Water-soluble resin | DISPERBYK-190 | 2.75 | 2.75 | 2.75 | 2.75 | 2.75 | 2.75 | 2.75 | 2.75 | 2.75 | |
| | DISPERBYK-2015 | | | | | | | | | | 2.75 |
| | DISPERBYK-183 | | | | | | | | | | |
| | BYK-154 | | | | | | | | | | |
| | Product name | | | | | | | | | | |
| Hydrophilic, layered clay mineral | LUCENTITE SWF | 1 | 1 | 1 | | 1 | 1 | 1 | | | |
| | LUCENTITE SWN | | | | | | | | 1 | | |
| | LAPONITE RDS | | | | | | | | | 1 | |
| Surfactant | OLFINE E1010 | 1 | 1 | 1 | 1 | 1 | 1 | 1 | 1 | 1 | 1 |
| Water-soluble organic solvent | Glycerin | 10 | 10 | 10 | 10 | 10 | 10 | 10 | 10 | 10 | 10 |
| Deionized water | | Rest | Rest | Rest | Rest | Rest | Rest | Rest | Rest | Rest | Rest |
| Volume average secondary particle diameter of titanium dioxide (nm) | | 280 | 250 | 360 | 280 | 320 | 270 | 285 | 280 | 280 | 310 |
| Evaluation results | Re-dispersibility | A | A | A | D | B | A | A | A | B | D |
| | Maintainability | A | A | B | C | B | A | A | A | A | C |
| | Concealability | A | B | A | D | C | A | A | B | C | C |

TABLE 3

| | | \multicolumn{8}{c}{Example or Comparative Example (Comparative Example: "C" was added before number.)} | | | | | | | |
|---|---|---|---|---|---|---|---|---|---|
| | | 9 | C3 | 10 | 11 | 12 | 13 | C4 | 14 | 15 |
| White ink composition | | 11 | 12 | 13 | 14 | 15 | 16 | 17 | 18 | 19 |
| | Product name | | | | | | | | | |
| Titanium dioxide | R-630 | 10 | 10 | 10 | 10 | 10 | | | 10 | 10 |
| | R-680 | | | | | | | | | |
| | CR-60 | | | | | | | | | |
| | A-220 | | | | | | | 10 | | |
| | CR-90 | | | | | | 10 | | | |
| | CR-50-2 | | | | | | | | | |
| | CR-Super70 | | | | | | | | | |
| | Product name | | | | | | | | | |
| Water-soluble resin | DISPERBYK-190 | | | | | | | 2.75 | 2.75 | 2.75 |
| | DISPERBYK-2015 | 2.75 | | | | | | | | |
| | DISPERBYK-183 | | | 2.12 | | | | | | |
| | BYK-154 | | | | 0.5 | 2.62 | 0.5 | | | |

TABLE 3-continued

| | | Example or Comparative Example (Comparative Example: "C" was added before number.) | | | | | | | |
|---|---|---|---|---|---|---|---|---|---|
| | | 9 | C3 | 10 | 11 | 12 | 13 | C4 | 14 | 15 |
| | Product name | | | | | | | | | |
| Hydrophilic, layered clay mineral | LUCENTITE SWF | 1 | 1 | 1 | 1 | 1 | 1 | | 0.25 | 0.5 |
| | LUCENTITE SWN | | | | | | | | | |
| | LAPONITE RDS | | | | | | | | | |
| Surfactant | OLFINE E1010 | 1 | 1 | 1 | 1 | 1 | 1 | 1 | 1 | 1 |
| Water-soluble organic solvent | Glycerin | 10 | 10 | 10 | 10 | 10 | 10 | 10 | 10 | 10 |
| Deionized water | | Rest | Rest | Rest | Rest | Rest | Rest | Rest | Rest | Rest |
| Volume average secondary particle diameter of titanium dioxide (nm) | | 310 | Unevaluable | 300 | 280 | 300 | 310 | 220 | 280 | 280 |
| Evaluation results | Re-dispersibility | B | — | B | C | C | C | D | C | B |
| | Maintainability | A | — | B | B | B | B | C | B | B |
| | Concealability | A | — | A | A | A | A | E | C | B |

TABLE 4

| | | Example | | | | | | |
|---|---|---|---|---|---|---|---|---|
| | | 16 | 17 | 18 | 19 | 20 | 21 | 22 |
| White ink composition | | 20 | 21 | 22 | 23 | 24 | 25 | 26 |
| | Product name | | | | | | | |
| Titanium dioxide | R-630 | 10 | 10 | 10 | 10 | 10 | 10 | 10 |
| | R-680 | | | | | | | |
| | CR-60 | | | | | | | |
| | A-220 | | | | | | | |
| | CR-90 | | | | | | | |
| | CR-50-2 | | | | | | | |
| | CR-Super70 | | | | | | | |
| | Product name | | | | | | | |
| Water-soluble resin | DISPERBYK-190 | 2.75 | 2.75 | 0.25 | 0.75 | 1.5 | 3.75 | 5 |
| | DISPERBYK-2015 | | | | | | | |
| | DISPERBYK-183 | | | | | | | |
| | BYK-154 | | | | | | | |
| | Product name | | | | | | | |
| Hydrophilic, layered clay mineral | LUCENTITE SWF | 1.25 | 1.5 | 1 | 1 | 1 | 1 | 1 |
| | LUCENTITE SWN | | | | | | | |
| | LAPONITE RDS | | | | | | | |
| Surfactant | OLFINE E1010 | 1 | 1 | 1 | 1 | 1 | 1 | 1 |
| Water-soluble organic solvent | Glycerin | 10 | 10 | 10 | 18 | 10 | 10 | 10 |
| Deionized water | | Rest | Rest | Rest | Rest | Rest | Rest | Rest |
| Volume average secondary particle diameter of titanium dioxide (nm) | | 280 | 280 | 280 | 280 | 280 | 280 | 280 |
| Evaluation results | Re-dispersibility | A | A | C | C | B | A | A |
| | Maintainability | A | B | B | B | B | B | B |
| | Concealability | A | A | B | B | A | A | B |

TABLE 5

| | | Example | | | |
|---|---|---|---|---|---|
| | | 23 | 24 | 25 | 26 |
| White ink composition | | 27 | 28 | 29 | 30 |
| | Product name | | | | |
| Titanium dioxide | R-630 | 10 | | | |
| | CR-90 | | 10 | | |
| | CR-50-2 | | | 10 | |
| | CR-Super70 | | | | 10 |
| Water-soluble resin | Product name | | | | |
| | DISPERBYK-190 | 2.75 | 2.75 | 2.75 | 2.75 |
| Hydrophilic, layered clay mineral | Product name | | | | |
| | LUCENTITE SWF | 1 | 1 | 1 | 1 |
| Water-soluble polymerizable compound | Hydroxyethyl acrylamide (Monofunctional acrylamide) | 15 | 15 | 15 | 15 |
| | Tetrafunctional acrylamide 1 (The exemplary polymerizable compound a) | 10 | 10 | 10 | 10 |
| Polymerization initiator | IRGACURE 2959 | 3 | 3 | 3 | 3 |
| Surfactant | OLFINE E1010 | 1 | 1 | 1 | 1 |

TABLE 5-continued

|  |  | Example | | | |
|---|---|---|---|---|---|
|  |  | 23 | 24 | 25 | 26 |
| Water-soluble organic solvent | SANNIX GP250 | 2 | 2 | 2 | 2 |
| Deionized water |  | Rest | Rest | Rest | Rest |
| Volume average secondary particle diameter of titanium dioxide (nm) |  | 280 | 320 | 270 | 285 |
| Evaluation results | Re-dispersibility | A | B | A | A |
|  | Maintainability | A | B | A | A |
|  | Concealability | A | C | A | A |

TABLE 6

|  |  | Example or Comparative Example (Comparative Example: "C" was added before number.) | |
|---|---|---|---|
|  |  | 27 | C5 |
| White ink composition |  | 31 | 32 |
| Titanium dioxide | Product name R-630 | 10 | 10 |
| Water-soluble resin | Product name DISPERBYK-190 | 2.75 | 2.75 |
| Hydrophilic, layered clay mineral | Product name LUCENTITE SWF | 1 |  |
| Polymer compound | Specific copolymer A-1 | 5 | 5 |
| Surfactant | Surfactant FS-34 | 1.7 | 1.7 |
| Water | Deionized water | Rest | Rest |
| Evaluation results | Re-dispersibility | A | B |
|  | Maintainability | A | C |
|  | Concealability | A | D |

TABLE 7

|  | Product name | Surface treatment | Average primary particle diameter (μm) |
|---|---|---|---|
| Titanium dioxide | R-630 | Al | 0.24 |
|  | R-680 | Al | 0.21 |
|  | CR-60 | Al | 0.28 |
|  | A-220 | Al | 0.16 |
|  | CR-90 | Al, Si | 0.25 |
|  | CR-50-2 | Al, Organic | 0.25 |
|  | CR-Super70 | Al, Zr, Organic | 0.25 |

|  | Product name | Detail | Acid value (mgKOH/g) | Amine value (mgKOH/g) |
|---|---|---|---|---|
| Water-soluble resin | DISPERBYK-190 | Block copolymer (solid content concentration: 40%) | 10 | — |
|  | DISPERBYK-2015 | Acrylic copolymer (solid content concentration: 40%) | 10 | — |
|  | DISPERBYK-183 | Block copolymer (solid content concentration: 52%) | — | 17 |
|  | BYK-154 | Ammonium salt of acrylic copolymer (solid content concentration: 42%) | — | — |

|  | Product name | Detail |
|---|---|---|
| Hydrophilic, layered clay mineral | LUCENTITE SWF | Smectite clay |
|  | LUCENTITE SWN | Smectite clay |
|  | LAPONITE RDS | Hectorite clay |

The results of Tables 2 to 6 indicate that the white ink compositions according to the invention have excellent concealability, as well as have excellent re-dispersibility and maintainability.

Additionally, by UV irradiation on images obtained in Examples 23 to 27, it was confirmed that the images were more excellent in scratch resistance than those in Examples 1 to 22.

Examples 28 to 35

White ink compositions were prepared in the same manner as Example 27 except that the exemplary compound A-1 used in the white ink composition of Example 27 as the specific copolymer was replaced by each of exemplary compounds A-2 to A-9. Then, evaluation was performed in the same manner, where all of the ink sets exhibited favorable re-dispersibility, maintainability, and concealability of images formed, and the results obtained were almost the same as those of Example 27.

The followings are structures, weight average molecular weights, and SP values of the exemplary compounds A-2 to A-9.

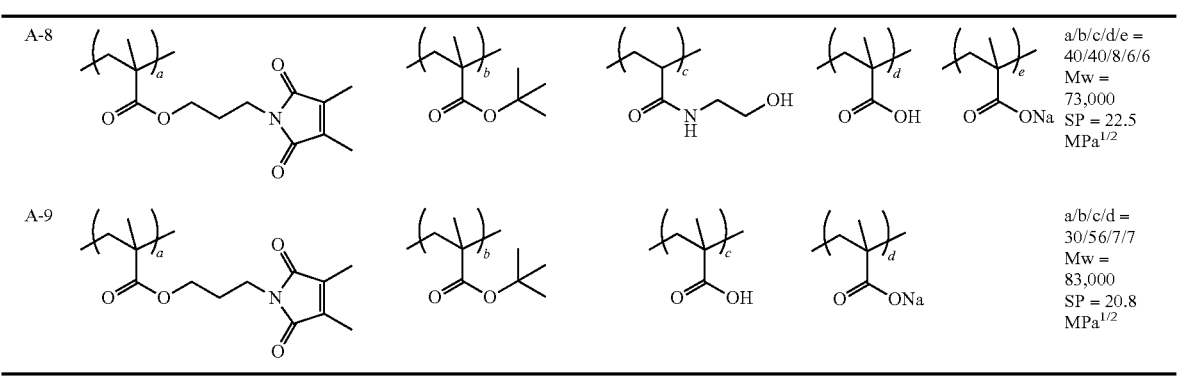

Exemplary embodiments of the invention include, but not limited to, the following.

<1> A white ink composition for inkjet recording, comprising:
titanium dioxide having an average primary particle diameter of from 200 nm to 350 nm;
a hydrophilic, layered clay mineral;
a water-soluble resin; and
water.

<2> The white ink composition according to <1>, wherein the hydrophilic, layered clay mineral is at least one selected from the group consisting of a synthetic smectite and a synthetic hectorite.

<3> The white ink composition according to <1> or <2>, wherein the water-soluble resin is an acrylic copolymer or a block copolymer and has an acid value of 10 mgKOH/g or greater.

<4> The white ink composition according to any one of <1> to <3>, wherein the water-soluble resin is a block copolymer.

<5> The white ink composition according to any one of <1> to <4>, wherein a content of the hydrophilic, layered clay mineral is from 0.1% by mass to 2% by mass with respect to a total mass of the white ink composition.

<6> The white ink composition according to any one of <3> to <5>, wherein a mass ratio of the water-soluble resin to the titanium dioxide is from 6/100 to 15/100, and the water-soluble resin is a non-polymerizable resin.

<7> The white ink composition according to any one of <1> to <6>, wherein the hydrophilic, layered clay mineral is a synthetic smectite.

<8> The white ink composition according to <1>, wherein:
the hydrophilic, layered clay mineral is a synthetic hectorite,
the water-soluble resin is a block copolymer and has an acid value of 10 mgKOH/g or greater, and
a content of the synthetic hectorite is from 0.1% by mass to 2% by mass with respect to a total mass of the white ink composition.

<9> The white ink composition according to any one of <1> to <8>, further comprising a water-soluble polymerizable compound and a polymerization initiator.

<10> The white ink composition according to <9>, wherein the water-soluble polymerizable compound includes a (meth)acrylamide compound.

<11> The white ink composition according to <9> or <10>, wherein a content of the water-soluble polymerizable compound is from 3% by mass to 25% by mass with respect to a total amount of the white ink composition.

<12> The white ink composition according to <1>, wherein:
the white ink composition further comprises a (meth)acrylamide compound and a polymerization initiator,
the hydrophilic, layered clay mineral is a synthetic hectorite,
the water-soluble resin is a block copolymer and has an acid value of 10 mgKOH/g or greater,
a content of the synthetic hectorite is from 0.1% by mass to 2% by mass with respect to a total mass of the white ink composition, and
a content of the (meth)acrylamide compound is from 3% by mass to 25% by mass with respect to a total amount of the white ink composition.

<13> The white ink composition according to any one of <1> to <12>, further comprising a polymer compound that comprises:
a repeating unit having a partial structure represented by the following Formula (1); and
a repeating unit having a hydrophilic group:

Formula (1)

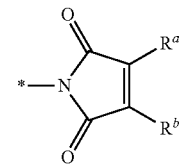

wherein, in Formula (1), each of $R^a$ and $R^b$ independently represents a hydrogen atom or an alkyl group having from 1 to 4 carbon atoms; at least one selected from the group consisting of $R^a$ and $R^b$ represents an alkyl group having from 1 to 4 carbon atoms; $R^a$ and $R^b$ may be bonded to each other to form a 4- to 6-membered alicyclic structure; and the asterisk * represents a site bonding to a main chain or a side chain of the polymer compound.

<14> The white ink composition according to <13>, wherein a ratio of a content of the polymer compound to a content of the titanium dioxide in the white ink composition is from 1/4 to 1/1 in terms of mass.

<15> The white ink composition according to <13> or <14>, wherein the polymer compound further comprises a repeating unit having a hydrophobic group.

<16> The white ink composition according to any one of <13> to <15>, wherein the polymer compound, which is in an unneutralized state, has a solubility parameter of from 20.7 $MPa^{1/2}$ to 23.0 $MPa^{1/2}$.

What is claimed is:

1. A white ink composition for inkjet recording, comprising:
   titanium dioxide having an average primary particle diameter of from 200 nm to 350 nm;
   a hydrophilic, layered clay mineral;
   a water-soluble resin; and
   water; wherein
   the hydrophilic, layered clay mineral is at least one selected from the group consisting of a synthetic smectite and a synthetic hectorite.

2. The white ink composition according to claim 1, wherein the water-soluble resin is an acrylic copolymer or a block copolymer and has an acid value of 10 mgKOH/g or greater.

3. The white ink composition according to claim 1, wherein the water-soluble resin is a block copolymer.

4. The white ink composition according to claim 1, wherein a content of the hydrophilic, layered clay mineral is from 0.1% by mass to 2% by mass with respect to a total mass of the white ink composition.

5. The white ink composition according to claim 2, wherein a mass ratio of the water-soluble resin to the titanium dioxide is from 6/100 to 15/100, and the water-soluble resin is a non-polymerizable resin.

6. The white ink composition according to claim 1, wherein the hydrophilic, layered clay mineral is a synthetic smectite.

7. The white ink composition according to claim 1, wherein:
   the hydrophilic, layered clay mineral is a synthetic hectorite,
   the water-soluble resin is a block copolymer and has an acid value of 10 mgKOH/g or greater, and
   a content of the synthetic hectorite is from 0.1% by mass to 2% by mass with respect to a total mass of the white ink composition.

8. The white ink composition according to claim 1, further comprising a water-soluble polymerizable compound and a polymerization initiator.

9. The white ink composition according to claim 8, wherein the water-soluble polymerizable compound includes a (meth)acrylamide compound.

10. The white ink composition according to claim 8, wherein a content of the water-soluble polymerizable compound is from 3% by mass to 25% by mass with respect to a total amount of the white ink composition.

11. The white ink composition according to claim 1, wherein:
    the white ink composition further comprises a (meth)acrylamide compound and a polymerization initiator,
    the hydrophilic, layered clay mineral is a synthetic hectorite,
    the water-soluble resin is a block copolymer and has an acid value of 10 mgKOH/g or greater,
    a content of the synthetic hectorite is from 0.1% by mass to 2% by mass with respect to a total mass of the white ink composition, and
    a content of the (meth)acrylamide compound is from 3% by mass to 25% by mass with respect to a total amount of the white ink composition.

12. The white ink composition according to claim 1, further comprising a polymer compound that comprises:
    a repeating unit having a partial structure represented by the following Formula (1); and
    a repeating unit having a hydrophilic group:

Formula (1)

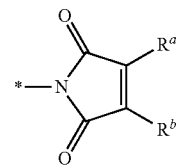

(1)

wherein, in Formula (1), each of $R^a$ and $R^b$ independently represents a hydrogen atom or an alkyl group having from 1 to 4 carbon atoms; at least one selected from the group consisting of $R^a$ and $R^b$ represents an alkyl group having from 1 to 4 carbon atoms;
$R^a$ and $R^b$ may be bonded to each other to form a 4- to 6-membered alicyclic structure; and the asterisk * represents a site bonding to a main chain or a side chain of the polymer compound.

13. The white ink composition according to claim 12, wherein a ratio of a content of the polymer compound to a content of the titanium dioxide in the white ink composition is from 1/4 to 1/1 in terms of mass.

14. The white ink composition according to claim 12, wherein the polymer compound further comprises a repeating unit having a hydrophobic group.

15. The white ink composition according to claim 12, wherein the polymer compound, which is in an unneutralized state, has a solubility parameter of from 20.7 MPa$^{1/2}$ to 23.0 MPa$^{1/2}$.

16. An ink set for multilayer formation comprising:
    the white ink composition according to claim 1; and
    an ink composition for inkjet recording, comprising a colorant having a hue other than white.

17. An image forming method comprising:
    applying the white ink composition according to claim 8 to a recording medium; and
    irradiating the white ink composition applied to the recording medium with an active energy ray.

18. A printed matter comprising an image formed on a recording medium by the image forming method according to claim 17.

* * * * *